(12) United States Patent
Park et al.

(10) Patent No.: US 10,355,500 B2
(45) Date of Patent: Jul. 16, 2019

(54) WIRELESS CHARGING DEVICE

(71) Applicant: Samsung Electronics Co., Ltd., Suwon-si (KR)

(72) Inventors: Sung-Bum Park, Suwon-si (KR); Do-Won Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 329 days.

(21) Appl. No.: 15/003,610

(22) Filed: Jan. 21, 2016

(65) Prior Publication Data
US 2016/0211696 A1    Jul. 21, 2016

(30) Foreign Application Priority Data
Jan. 21, 2015   (KR) .......................... 10-2015-0010051

(51) Int. Cl.
*H02J 7/00* (2006.01)
*H02J 50/12* (2016.01)
*H02J 50/70* (2016.01)

(52) U.S. Cl.
CPC ............ *H02J 7/0042* (2013.01); *H02J 50/12* (2016.02); *H02J 50/70* (2016.02)

(58) Field of Classification Search
USPC ........................................................ 320/108
See application file for complete search history.

(56) References Cited

U.S. PATENT DOCUMENTS

| 2008/0234009 A1 | 9/2008 | Zeiger et al. |
| 2011/0222154 A1* | 9/2011 | Choi ............... H04N 13/0429 |
| | | 320/108 |
| 2011/0234155 A1 | 9/2011 | Chen et al. |
| 2012/0169278 A1* | 7/2012 | Choi .................. H04B 5/0037 |
| | | 320/108 |
| 2014/0132211 A1 | 5/2014 | Kim et al. |

(Continued)

FOREIGN PATENT DOCUMENTS

| KR | 20120078995 | 7/2012 |
| KR | 20140010245 | 1/2014 |

(Continued)

OTHER PUBLICATIONS

Int'l Search Report and Written Opinion for PCT/KR2016/000571 dated Apr. 21, 2016.

*Primary Examiner* — Robert J Grant
(74) *Attorney, Agent, or Firm* — Sughrue Mion, PLLC

(57) ABSTRACT

A wireless charging device for wirelessly transmitting electric power to an electronic device includes a housing, a system board within the housing and including a power amplifier, a shield-can within the housing with a separation distance between a top of the housing and a top of the shield can, a transmission resonator between the top of the housing and the top of the shield-can for simultaneously generating a vertical magnetic field and a horizontal magnetic field, and a sheet provided between the shield-can and the transmission resonator for shielding the system board and the transmission resonator from each other's electromagnetic fields, wherein the electromagnetic fields comprise the vertical magnetic field and the horizontal magnetic field generated by the transmission resonator and an electromagnetic field generated by the system board.

26 Claims, 20 Drawing Sheets

(56) References Cited

U.S. PATENT DOCUMENTS

| | | | |
|---|---|---|---|
| 2014/0177181 A1* | 6/2014 | Malek | H05K 9/003 |
| | | | 361/749 |
| 2014/0184151 A1* | 7/2014 | Han | H01F 5/04 |
| | | | 320/108 |
| 2014/0203772 A1 | 7/2014 | Yeo et al. | |
| 2014/0347006 A1* | 11/2014 | Kim | H02J 7/025 |
| | | | 320/108 |
| 2014/0375246 A1 | 12/2014 | Boysen et al. | |

FOREIGN PATENT DOCUMENTS

| | | |
|---|---|---|
| KR | 20140060636 | 5/2014 |
| KR | 20140094779 | 7/2014 |
| KR | 20140105333 | 9/2014 |

* cited by examiner

WIRELESS CHARGING DEVICE

RELATED APPLICATION(S)

This application claims the priority under 35 U. S. C. § 119(a) to Korean Application Serial No. 10-2015-0010051, which was filed in the Korean Intellectual Property Office on Jan. 21, 2015, the entire content of which is hereby incorporated by reference.

BACKGROUND

Various embodiments of the present disclosure relate to a charging device, and more particularly to a wireless charging device.

In general, a mobile terminal, such as a portable electronic device, includes a rechargeable battery pack. Typically, the battery pack of the mobile terminal is charged using a separate charging device that plugs into the mobile terminal.

Separate contact terminals are generally provided on the outside of the charging device and the battery pack so that the charging device and the battery pack can be electrically connected to each other. However, because the contact terminal is exposed to the outside in the contact type charging method, the battery pack may not be properly charged when the contacts are contaminated by foreign substances. Further, the battery pack may not charge properly when the contact terminal is exposed to moisture.

In order to solve the above-mentioned problems, wireless charging, or non-contact charging, technologies have recently been developed and have been utilized for a number of portable electronic devices. The wireless charging technology uses wireless power transmission and reception that automatically charges a battery pack as long as a portable electronic device is positioned on the charging pad with no need to connect a separate charging connector to the portable electronic device.

The wireless charging technology generally uses an electromagnetic induction scheme using a coil, a resonance scheme using a frequency resonance, or an RF/microwave radiation scheme that converts electrical energy to microwave and then transmits the microwave.

Up to now, the electromagnetic induction scheme has been considered mainstream, but it is expected that in the near future all electronic products will be wirelessly charged, anytime and anywhere, based on recent successful experiments for wirelessly transmitting power to a destination that is separated by dozens of meters using microwaves.

The resonance scheme uses the same physical concept of resonance that can lead to a wine glass breaking if its resonant frequency is the same as a tuning fork that is struck. For wireless charging, instead of resonating sounds, the resonance of electromagnetic waves containing electrical energy is used to remotely transfer electrical energy from the charger to the battery pack. It is known that resonant electrical energy does not affect surrounding machines and human bodies any more than other electromagnetic waves because the resonant electrical energy is directly transferred to a device that has the same resonant frequency and its unused part is reabsorbed into an electromagnetic field instead of spreading.

The wireless charging device using a resonator according to the related art includes a transmission resonator and a wireless power transmission device. The wireless charging device includes a transmission resonator that provides charging power from a wireless power transmission device and a wireless power transmission pad containing a metal plate or a magnetic shield member at a predetermined interval from the transmission resonator.

That is, the wireless charging device using the resonator adopts a method of positioning an electronic device on a wireless power transmission pad to charge the electronic device.

SUMMARY

Typically a resonator type wireless charging device includes a wireless power transmission pad that occupies a large area. Accordingly, manufacturing costs of the product will increase because of the large wireless power transmission pad needed. In addition, if a wearable device is placed on the upper surface of a large charging pad in order to be charged, and the charging efficiency may be lowered or the wearable device may not charge well on the pad as the charging distance between the pad and the wearable device becomes larger, or the wearable device is placed at an angle not conducive to efficient charging by the charging pad.

Accordingly, various embodiments of the present disclosure provide for a wireless charging device in which a sheet is provided at a predetermined separation distance between top of a housing and a shield-can. The sheet may shield a transmission resonator from the electromagnetic field emanating from the system board in the shield-can, and/or vice versa. Various embodiments of the present disclosure may also provide for a transmission resonator that simultaneously generates a vertical magnetic field and a horizontal magnetic field so that an electronic device can be charged via a side surface of the wireless charging device as well as on an upper surface thereof. Accordingly, the product can be miniaturized as a large pad is not necessary and charging efficiency of the product can be enhanced as well.

Various embodiments of the present disclosure also provide for a wireless charging device in which a sheet is not provided between a shield-can and a transmission resonator, where the transmission resonator may simultaneously generate a vertical magnetic field and a horizontal magnetic field. Accordingly, manufacturing costs can be reduced and the assembly process of the product can be simplified by eliminating the sheet for shielding an electromagnetic field of a system board. An electronic device can be charged via a side surface of the wireless charging device as well as via an upper surface thereof, the product can be miniaturized as a large charging pad is not necessary, and the charging efficiency of the product can be enhanced.

In accordance with an aspect of the present disclosure, there is provided a wireless charging device for wirelessly transmitting electric power to an electronic device. The wireless charging device may include a housing, a system board within the housing and including a power amplifier, a shield-can within the housing with a separation distance between a top of the housing and a top of the shield can, a transmission resonator between the top of the housing and the top of the shield-can for simultaneously generating a vertical magnetic field and a horizontal magnetic field, and a sheet provided between the shield-can and the transmission resonator for shielding the system board and the transmission resonator from each other's electromagnetic fields, wherein the electromagnetic fields comprise the vertical magnetic field and the horizontal magnetic field generated by the transmission resonator and an electromagnetic field generated by the system board.

In accordance with another aspect of the present disclosure, there is provided a wireless charging device for wirelessly transmitting electric power, the wireless charging device including a housing, a shield-can within the housing with a separation distance between top of the housing and top of the shield-can, a system board within the housing and comprising a power amplifier, and a transmission resonator between the top of the housing and the top of the shield-can for simultaneously generating a vertical magnetic field and a horizontal magnetic field.

According to various embodiments of the present disclosure, a vertical magnetic field and a horizontal magnetic field can be simultaneously generated, and the directions and intensities thereof can be varied by providing a sheet between a housing and a shield-can, with predetermined separation distances between the shield-can and the sheet, between the sheet and a shield member, and between the shield member and the top of the housing. In embodiments of the present disclosure where the sheet is not present, the predetermined separation distances may be between the shield-can and the shield member and between the shield member and the top of the housing. The separation distances may be individually varied to control the direction and/or intensity of the vertical and/or horizontal magnetic fields. Accordingly, because a charging pad according to embodiments of the present disclosure can be made smaller than present charging pads, manufacturing costs can be reduced. Additionally, charging efficiency can be improved because of the presence of vertical and horizontal magnetic fields. Moreover, an electronic device and a wearable device can be charged independently or simultaneously. Furthermore, because some embodiments of the present disclosure does not have to include a sheet for shielding an electromagnetic field generated by a system board, manufacturing costs can be further reduced with respect to those embodiments that do include the sheet between a housing and a shield-can.

BRIEF DESCRIPTION OF THE DRAWINGS

The aspects, features, and advantages of the present disclosure will be more apparent from the following detailed description taken in conjunction with the accompanying drawings, in which.

DETAILED DESCRIPTION

Figure 1:
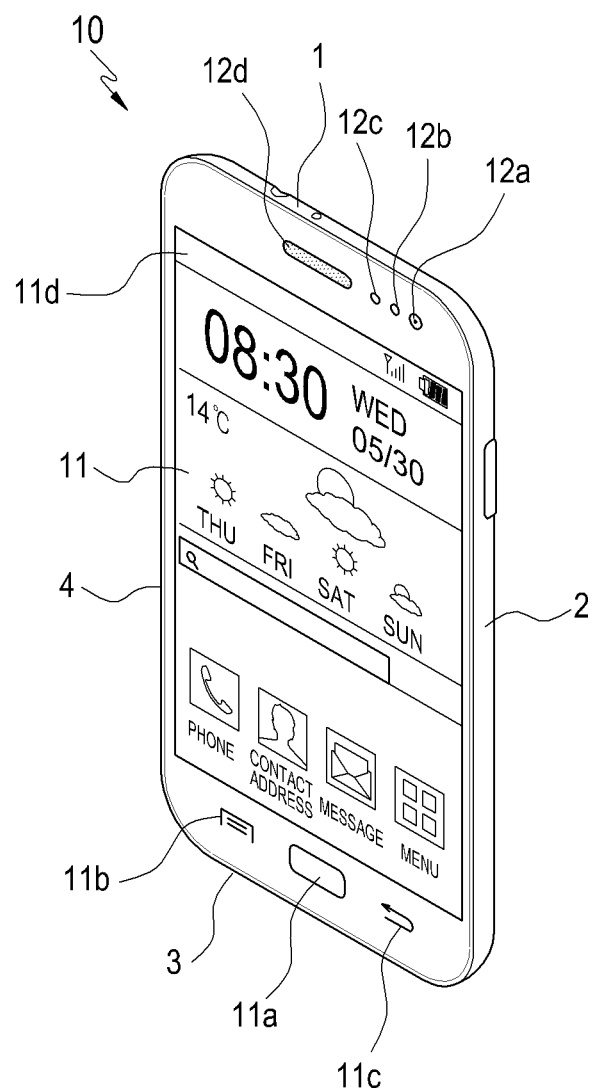
FIG. 1 is a perspective view illustrating a front surface of an electronic device that may be wirelessly charged using a wireless charging device according to various embodiments of the present disclosure.

The present disclosure uses general terms that are currently widely used in the area of technology to which this disclosure belongs. Although meanings of the terms may change over time, the terms used in this disclosure should be viewed with their accepted meaning at the time of this disclosure. In certain cases, however, a term may be defined by the applicant. In such a case, the meaning of the term will be described at the corresponding part of the present disclosure. Thus, the terms used in various embodiments of the present disclosure should be defined based on the generally accepted meanings of the terms by those skilled in the art or the defined meanings in the present disclosure.

Although the terms including an ordinal number such as first, second, etc. can be used for describing various elements, the elements are not restricted by the terms. Unless specified otherwise, the ordinal numbers are used merely to distinguish an element from the other elements, and not to place relative importance or a strict order among the elements. For example, a first element and a second element could be renamed to a second element and a first element, respectively, without departing from the scope of the present disclosure.

The present disclosure describes various embodiments of a wireless charging device and charging an electronic device using the wireless charging device. First, the electronic charging devices according to embodiments of the present disclosure may be applied to not only all types of mobile communication terminals that are operated based on communication protocols corresponding to various communication systems, but also to all types of information and communication devices, multimedia devices, and application devices thereof, including a video phone, an electronic book (e-book) reader, a laptop personal computer (PC), a netbook computer, a personal digital assistant (PDA), a portable multimedia player (PMP), an MP3 (MPEG-1 audio layer-3) player, a mobile medical appliance, a camera, or a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. For example, the smart home appliance may include at least one of a television, a digital video disk (DVD) player, an audio, a refrigerator, an air conditioner, a vacuum cleaner, an oven, a microwave oven, a washing machine, an air cleaner, a set-top box, a television (TV) box (e.g., Samsung HomeSync™, Apple TV™, or Google TV™), a game console, an electronic dictionary, an electronic key, a camcorder, and an electronic photo frame.

According to some embodiments, the electronic device may include at least one of various medical devices (e.g., a magnetic resonance angiography (MRA) machine, a magnetic resonance imaging (MRI) machine, a computed tomography (CT) machine, and an ultrasonic machine), navigation devices, global positioning system (GPS) receivers, event data recorders (EDR), flight data recorders (FDR), vehicle infotainment devices, electronic devices for ships (e.g., navigation devices for ships, and gyro-compasses), avionics, security devices, automotive head units, robots for home or industry, automatic teller's machines (ATMs) in banks, or point of sales (POS) in shops.

According to some embodiments, the electronic device may include at least one of furniture, a part of a building/structure, an electronic board, an electronic signature receiving device, a projector, and various types of measuring devices (e.g., a water meter, an electric meter, a gas meter, a radio wave meter, etc.).

An electronic device according to various embodiments of the present disclosure may be a combination of one or more of above described various devices. Also, an electronic device according to various embodiments of the present disclosure may be a physically flexible device. Also, an electronic device according to various embodiments of the present disclosure is not limited to the above described devices.

Figure 2:
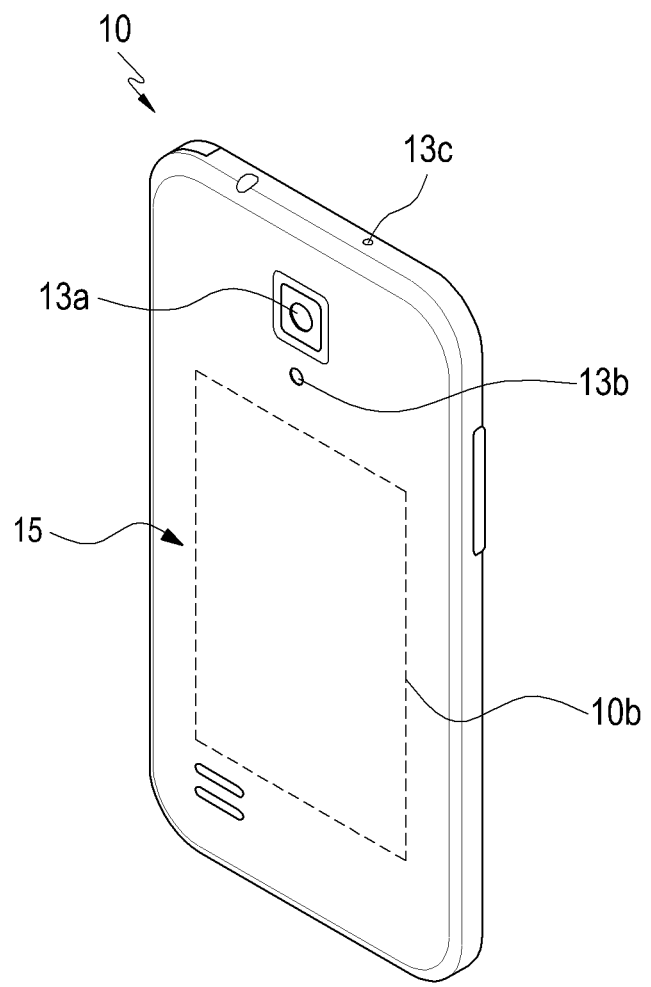
FIG. 2 is a perspective view illustrating a rear surface of an electronic device that may be wirelessly charged using a wireless charging device according to various embodiments of the present disclosure.
Figure 9:
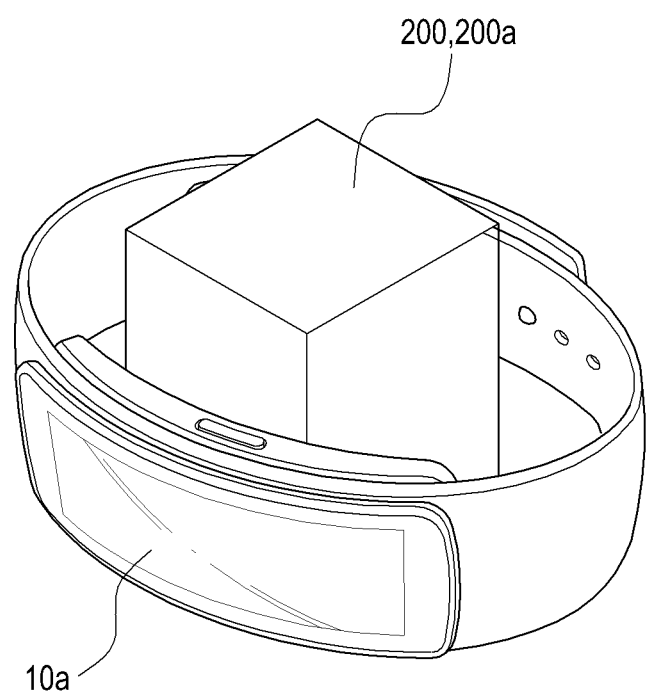
FIG. 9 is a perspective view illustrating a state in which a wearable device according to various embodiments of the present disclosure is placed near a side surface of a wireless charging device to be charged.

FIG. 1 is a perspective view illustrating the front surface of an electronic device. FIG. 2 is a perspective view illustrating the rear surface of the electronic device. The electronic device 10 may be a smart phone, or a wearable device 10a (FIG. 9). The configuration of the electronic device 10 such as a smart phone, or a wearable device 10a, will be described with reference to FIGS. 1 and 2.

As illustrated in FIG. 1, a touch screen 11 may be disposed in the center of the front surface of the electronic device 10. The touch screen 11 may occupy most of the front surface of the electronic device 10. FIG. 1 illustrates an example in which a main home screen is displayed on the touch screen 11. The main home screen is the first screen that is displayed on the touch screen 11 when the electronic device 10 is turned on. Further, in cases where the electronic device 10 has different screens that can be viewed, the main home screen may be the first of the several screens. Shortcut icons for executing frequently used applications, a main menu switching key, time, weather, etc. may be displayed on the main home screen. The main menu switching key may display a menu screen on the touch screen 11. A status bar 11d for displaying statuses, such as a battery charging status, strength of a received signal, and current time, may also be formed on the upper end of the touch screen 11. A home button 11a, a menu button 11b, and a back button 11c may be formed on the lower side of the touch screen 11.

The home button 11a may display the main home screen on the touch screen 11. For example, when the home button 11a is touched when a non-main home screen is displayed, the main home screen may be displayed on the touch screen 11. Further, when the home button 11a is touched while applications are being executed on the touch screen 11, the main home screen may be displayed on the touch screen 11. Also, the home button 11a may also be used to display recently used applications or a task manager on the touch screen 11. The menu button 11b may provide a connectivity menu which may be used on the touch screen 11. The connectivity menu may include, for example, a widget addition menu, a background switching menu, a search menu, an editing menu, an environment setting menu, etc. The back button 11c may display the screen displayed just before the current screen, or may terminate the most recently used application.

According to various embodiments of the present disclosure, a first camera 12a, an illumination sensor 12b, or a proximity sensor 12c may be disposed on the upper end portion of the front surface of the electronic device 10. A second camera 13a, a flash 13b, or a speaker 13c may be disposed on the rear surface of the electronic device 10 as shown in FIG. 2. If the electronic device 10 is configured such that a battery pack is detachable, the rear surface of the electronic device 10 may comprise a detachable battery cover 15.

An electronic device 10 described below may be, for example, any one of the wearable device 10a, a notebook, a netbook, a smart phone, and a tablet PC. In this embodiment, the wearable device 10a may include a smart watch.

In addition, the electronic device 10 and the wearable device 10a may include a wireless power receiving module (not shown) for wirelessly charging a battery pack and a reception resonator 10b. The reception resonator 10b may have current induced in it by a magnetic field generated by a wireless charging device.

Figure 3:
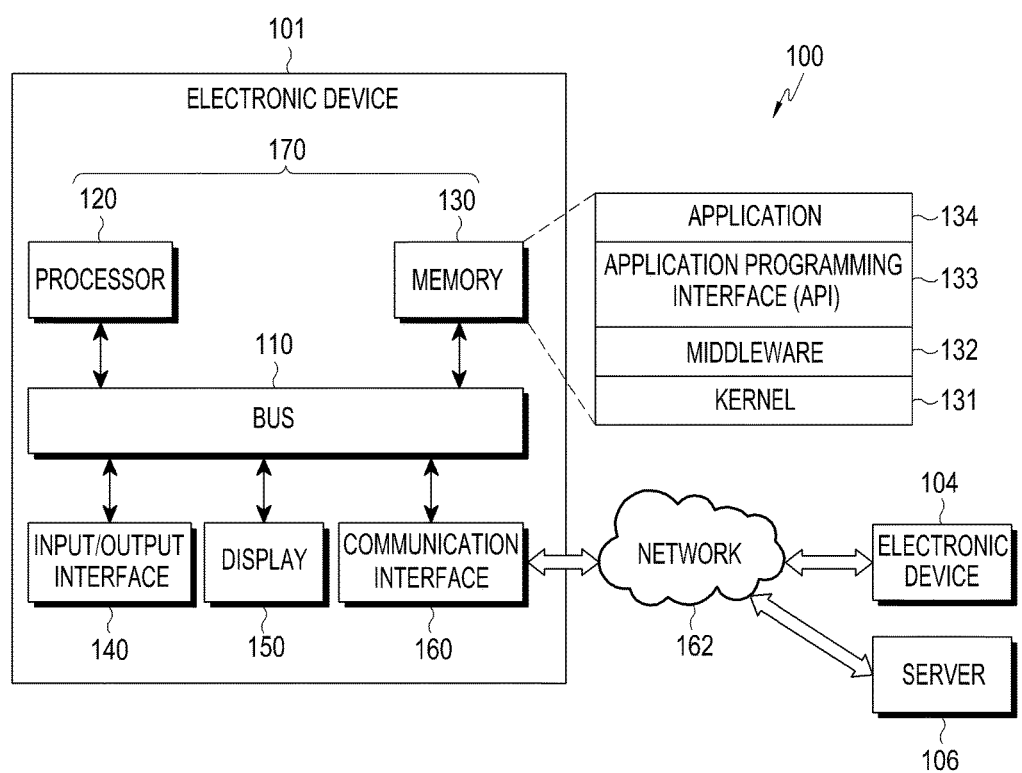
FIG. 3 is a block diagram illustrating a network environment including an electronic device according to various embodiments of the present disclosure.

FIG. 3 illustrates a network environment 100 including an electronic device 101 according to various embodiments.

Referring to FIG. 3, the electronic device 101, which may be similar to the electronic device 10, may include a bus 110, a processor 120, a memory 130, an input/output interface 140, a display unit 150, and a communication interface 160. The bus 110 may comprise circuitry for connecting elements of the electronic device 101 and transferring communication (e.g., a control message) between the elements.

The processor 120 may, for example, receive instructions from the other components (e.g., the memory 130, the input/output interface 140, the display unit 150, the communication interface 160, etc.) through the bus 110, decode the received instructions, and carry out operations or data processing according to the decoded instructions.

The memory 130 may store instructions or data received from, or generated by the processor 120 or the other components (e.g., the input/output interface 140, the display unit 150, the communication interface 160, etc.). The memory 130 may include, for example, programming modules, such as a kernel 131, middleware 132, an Application Programming Interface (API) 133, applications 134, etc. The programming modules may be configured with software, firmware, hardware, or a combination of two or more thereof.

The kernel 131 may control or manage system resources (e.g., the bus 110, the processor 120, the memory 130, etc.) that are used to execute operations or functions implemented in the other programming modules, for example, the middleware 132, the API 133, and the applications 134. Further, the kernel 131 may provide an interface through which the middleware 132, the API 133, or the applications 134 access individual elements of the electronic device 101 to control or manage the elements.

The middleware 132 may function as an intermediary that makes the API 133 or the applications 134 communicate with the kernel 131 to exchange data. Further, in regard to task requests received from the applications 134, the middleware 132 may, for example, control (e.g., scheduling or load balancing) the task requests using a method of assigning a priority to use system resources of the electronic device 101 (e.g., the bus 110, the processor 120, the memory 130, etc.) to at least one of the applications 134.

The API 133 is an interface used by the application 134 to control a function provided from the kernel 131 or the middleware 132, and may include, for example, at least one interface or function (e.g., instruction) for file control, window control, image processing, text control, etc.

According to various embodiments of the present disclosure, the applications 134 may include, for example, a short message service (SMS)/multimedia message service (MMS) application, an e-mail application, a calendar application, an alarm application, a health care application (e.g., an application for measuring a work rate or blood sugar), an environment information application (e.g., an application for providing atmospheric pressure, humidity, or temperature information), etc. Additionally or alternatively, the applications 134 may be an application associated with information exchange between the electronic device 101 and an external electronic device (e.g., an electronic device 104). The application associated with information exchange may include, for example, a notification relay application for forwarding specific information to an external electronic device, or a device management application for managing an external electronic device.

For example, the notification relay application may have a function of forwarding to an external electronic device (e.g., the electronic device 104), notification information generated from other applications of the electronic device 101 (e.g., an SMS/MMS application, an e-mail application, a health care application, an environmental information application, etc.). Additionally or alternatively, the notification relay application may, for example, receive notification information from an external electronic device (e.g., the electronic device 104) and provide the received notification information to a user. The device management application may, for example, manage (e.g., install, delete, or update) a function for at least a part of an external electronic device (e.g., the electronic device 104) communicating with the electronic device 101 (e.g., activating/deactivating the external electronic device itself (or some components thereof) or adjusting the brightness (or resolution) of a display), an application operating in the external electronic device, or a service provided from the external electronic device (e.g., a telephone call service or a message service).

According to various embodiments, the applications 134 may include an application specified according to a property (e.g., type) of an external electronic device (e.g., the electronic device 104). For example, in cases where the external electronic device is an MP3 player, the applications 134 may include an application relating to the reproduction of music. Similarly, in cases where the external electronic device is a mobile medical device, the applications 134 may include an application relating to health care. According to an embodiment of this disclosure, the applications 134 may include at least one of the applications specified to the electronic device 10 or applications received from an external electronic device (e.g., a server 106 or the electronic device 104).

The input/output interface 140 may forward instructions or data input by a user through an input/output device (e.g., a sensor, a keyboard, or a touch screen) (not shown) to the processor 120, the memory 130, and the communication interface 160 through the bus 110. For example, the input/output interface 140 may provide the processor 120 with data corresponding to a user touch input through a touch screen (e.g., touch screen 11 in FIG. 1). The input/output interface 140 may, for example, output instructions or data received through the bus 110 from the processor 120, the memory 130, and the communication interface 160, through an input/output device (e.g., a speaker 13*c* or display unit 150). The input/output interface 140 may include an audio module.

The display unit 150 may display various types of information (e.g., multimedia data, text data, etc.) to a user.

The communication interface 160 may connect communication between the electronic device 10 and an external device (e.g., the electronic device 104 or the server 106). For example, the communication interface 160 may be connected to a network 162 through wireless or wired communication to communicate with the external device. The wireless communication may include, for example, at least one of wireless fidelity (Wi-Fi), Bluetooth (BT), near field communication (NFC), a global positioning system (GPS), and cellular communication (e.g., long term evolution (LTE), long term evolution advanced (LTE-A), code domain multiple access (CDMA), wideband code domain multiple access (WCDMA), universal mobile telecommunication system (UMTS), wireless broadband (WiBro), global system for mobile telecommunications (GSM), etc.). The wired communication may include, for example, at least one of a universal serial bus (USB), a high definition multimedia interface (HDMI), recommended standard 232 (RS-232), and a plain old telephone service (POTS).

The network 162 may include at least one of a computer network, the Internet, Internet of Things, and a telephone network. According to an embodiment of the present disclosure, a protocol for communication between the electronic device 101 and an external device (e.g., a transport layer protocol, a data link layer protocol, or a physical layer protocol) may be supported by at least one of the applications 134, the API 133, the middleware 132, the kernel 131, and the communication interface 160.

According to various embodiments of the disclosure, the processor 120 and the memory 130 together may be referred to as a controller 170. The controller 170 may control the overall operation of the electronic device 101, and may control supplying electric power to an antenna unit (not shown) for wireless communication as described below according to an embodiment of the present disclosure.

In addition, the controller 170 may control a wireless power reception module (not shown) and a reception resonator (not shown) in the electronic device 101 and a wearable device 10*a* to wirelessly charge a battery pack (not shown) through a wireless charging device 200 (FIGS. 4A & 4B) of the present disclosure. The reception resonator may be similar to the reception resonator 10*b* shown in FIG. 2.

The wireless charging device 200, according to various embodiments of the present disclosure, may be, for example, a device for wirelessly transmitting electric power and charging the electronic device 101, but the present disclosure is not limited thereto. That is, any electronic device 101 that is capable of wirelessly transmitting electric power to charge another electronic device 101 may also be referred to as the wireless charging device 200.

Figure 4A:
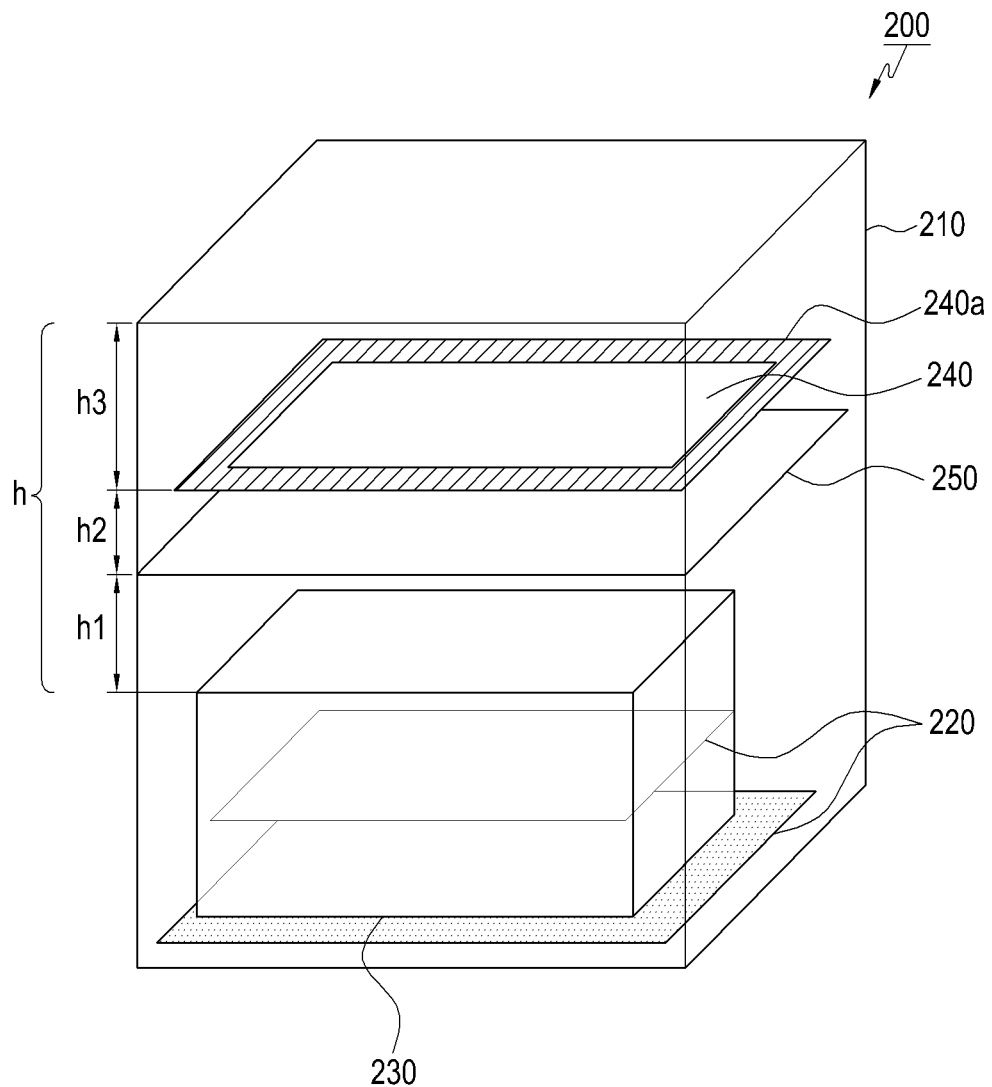
FIG. 4A is a perspective view illustrating a double layer arrangement of a sheet and a system board of a configuration of a wireless charging device according to various embodiments of the present disclosure.
Figure 4B:
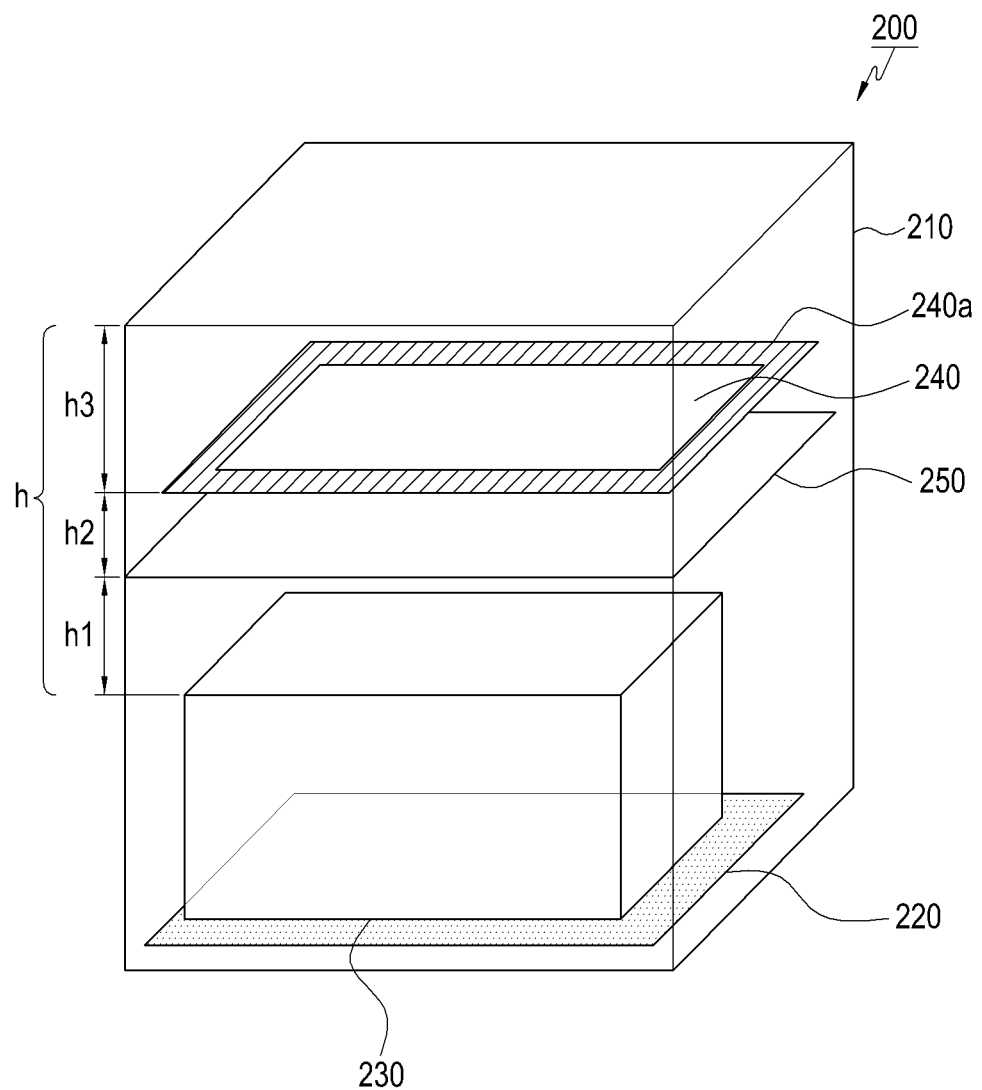
FIG. 4B is a perspective view illustrating a single layer arrangement of a sheet and a system board of a configuration of a wireless charging device according to various embodiments of the present disclosure.

FIG. 4A is a perspective view illustrating a double layer arrangement of a system board 220 of a configuration of a wireless charging device 200 including a sheet according to various embodiments of the present disclosure. FIG. 4B is a perspective view illustrating a single layer arrangement of a system board of a configuration of a wireless charging device 200 including a sheet according to various embodiments of the present disclosure.

In the wireless charging device 200 that includes a sheet 250, according to various embodiments of the present disclosure, the system board 220 may be implemented by a double layer arrangement as illustrated in FIG. 4A and may be implemented by a single layer arrangement as illustrated in FIG. 4B. That is, when the system board 220 has a single layer structure, it is implemented by removing a system board included in a shield-can 230, which will be described below. It is apparent that the wireless charging device 200, according to various embodiments of the present disclosure, is not limited to the above-mentioned embodiments. In addition, the system board 220 is not limited to a double layer arrangement and a single layer arrangement. That is, when the system board 220 is provided in the wireless charging device 200, it may be implemented by several layers, in addition to a double layer and a single layer. Here, in various embodiments of the present disclosure, an embodiment in which the system board 220 has a double layer arrangement will be described. Double layer may indicate, for example, that the system board 220 comprises two boards.

Referring to FIG. 4A, the wireless charging device 200 includes a housing 210, a system board 220, a shield-can 230, a transmission resonator 240, and a sheet 250.

The system board 220 includes a power amplifier (not shown), and the power amplifier outputs AC power around a resonant frequency using DC power from a power source (not shown) and a resonant frequency signal source (not shown). The power amplifier transmits the resonant frequency AC power to the transmission resonator 240. The resonant frequency AC power transmission may be, for example, a wireless transmission. The transmission resonator 240 may then generate magnetic fields that may be used to wirelessly charge an electronic device 101.

There may be a separation distance h between top of the housing 210 and top of the shield-can 230 such that a vertical magnetic field A1 and a horizontal magnetic field A2 (FIGS. 5A and 7A) are simultaneously generated by the transmission resonator 240. The flow of the high frequency AC current output by the power amplifier may be communicated to a transmission resonator 240 to generate the vertical magnetic field A1 and the horizontal magnetic field A2. Generation of the magnetic fields and use of the separation distance h will be explained in more detail in the following text.

A shield member 240*a* is provided around the transmission resonator 240 to increase resonance efficiency of the transmission resonator 240.

The system board 220 may be in the shield-can 230 to be shielded from the vertical magnetic field A1 and the horizontal magnetic field A2 generated by the transmission resonator 240, and also to protect the transmission resonator from the electromagnetic field generated by the system board 220. As illustrated in FIG. 4A, a portion of the system board 220 may be arranged inside the shield-can 230 and a portion of the system board 220 may be outside the shield-can 230. As illustrated in FIG. 4B, the system board 220 is only one board, it may be arranged outside the shield-can 230.

As illustrated in FIG. 4A, the system board 220 may have a double layer arrangement where a portion of the system board 220, which may comprise multiple boards, is inside the shield-can 230 and a portion of the system board 220 is outside the shield-can 230. As illustrated in FIG. 4B, the system board 220 may have a single layer arrangement provided outside the shield-can 230. That is, the system board 220 may be below the shield-can 230 and may be located to be distant from the transmission resonator 240.

The shield-can 230 functions to shield the system board 220 from the vertical magnetic field A1 and/or the horizontal magnetic field A2, and also the vertical magnetic field A1 and/or the horizontal magnetic field A2 from the electromagnetic field generated by the system board 220.

In addition, the sheet 250 may be provided between the shield-can 230 and the transmission resonator 240 in order to further shield the system board 220 and the transmission resonator 240 from each other's electromagnetic field. The sheet 250 may also help control the direction and intensity of the vertical magnetic field A1 and the horizontal magnetic field A2 (FIGS. 5A and 5B) generated by the transmission resonator 240.

Accordingly, the transmission resonator 240 may simultaneously generate the vertical magnetic field A1 and the horizontal magnetic field A2, and may wirelessly charge the electronic device 10 that is placed above the transmission resonator 240 or near the side of the transmission resonator 240.

As illustrated in FIGS. 4A and 4B, a separation distance h between the top of the housing 210 and the top of the shield-can 230 may include first, second, and third separation distances h1, h2, and h3. The first separation distance h1 is between the top of the shield-can 230 and the sheet 250, the second separation distance h2 is between the sheet 250 and the transmission resonator 240, and the third separation distance h3 is between the transmission resonator 240 and the top of the housing 210.

In addition, the areas of the vertical magnetic field A1 and the horizontal magnetic field A1 may be varied by making the intervals of the first, second, and third separation distances h1, h2, and h3 different or the same. That is, the vertical magnetic field A1 and the horizontal magnetic field A2 may be controlled by adjusting the intervals of the first, second, and third separation distances h1, h2, and h3.

Because the transmission resonator 240 is provided inside the housing 210, the electronic device 10 may be wirelessly charged after being positioned on an upper surface or near a side surface of the housing 210.

Accordingly, an electronic device 10 positioned on an upper surface of the housing 210 and another electronic device 10 positioned near a side surface of the housing 210 may be wirelessly charged at the same time by the magnetic fields A1 and A2 generated by the transmission resonator 240. The electronic device 10 positioned near the side surface may be a wearable device 10a.

The wearable device 10a may be, for example, any one of a Head-Mounted Device (HMD) (e.g., electronic eyeglasses), electronic clothes, an electronic bracelet, an electronic necklace, an electronic appcessory, an electronic tattoo, and a smart watch. In an embodiment of the present disclosure, a disclosed device may be described as a wearable device but the present disclosure is not limited thereto. That is, the present disclosure may be used to implement other devices than those described.

The electronic device 10 may be positioned alone on an upper surface of the housing 210 to be charged. In addition, the wearable device 10a may be positioned near a side surface of the housing 210 to be charged. Further, the electronic device 10 may be positioned on an upper surface of the housing 210 to be charged, and the wearable device 10a may be positioned on a side surface of the housing 210 to be charged at the same time.

The housing 210 may be a rectangular or cylindrical housing. In various embodiments of the present disclosure, in the housing 210 may have various other shapes.

The sheet 250 may be, for example, a metal sheet. Because the sheet 250 is provided below the transmission resonator 240, the sheet 250 may shield an electromagnetic field generated by the system board 220 from interfering with the vertical magnetic field A1 or the horizontal magnetic field A2. Accordingly, the charging efficiency of the electronic device 10 or the wearable device 10a positioned near the transmission resonator 240 may be enhanced.

The transmission resonator 240 may be formed of a printed circuit board having coiled or patterned traces for current path so that magnetic field may be generated by the current flowing in the current path.

The power amplifier (not shown) may be, for example, a switching power amplifier of Class-E or Class-D type. This will be described in more detail as follows.

The power amplifier (not shown) receives a signal from an input converter or another input power source (not shown), amplifies the received signal, and outputs the amplified signal to an output unit or another amplifying terminal. Because a signal from an input converter is generally very weak, it is necessary to sufficiently amplify the signal from the input converter in order to drive an output unit.

In an embodiment of the present disclosure, the switching power amplifier of Class-E or Class-D type is employed in an amplifier circuit using a pulse (digital) signal having a short on-time and a longer off-time. The main advantage of the switching power amplifier of Class-E or Class-D type is to significantly increase the overall efficiency of the amplifier because the amplifier is in the on state only for a short time period during which the amplifier consumes electric power. That is, because the switching power amplifier of Class-E or Class-D type operates a transistor only in a switching mode, only a minimum power loss occurs.

Operation of the wireless charging device including a sheet will be described in more detail below with reference to FIGS. 5A and 5B.

Figure 5A:
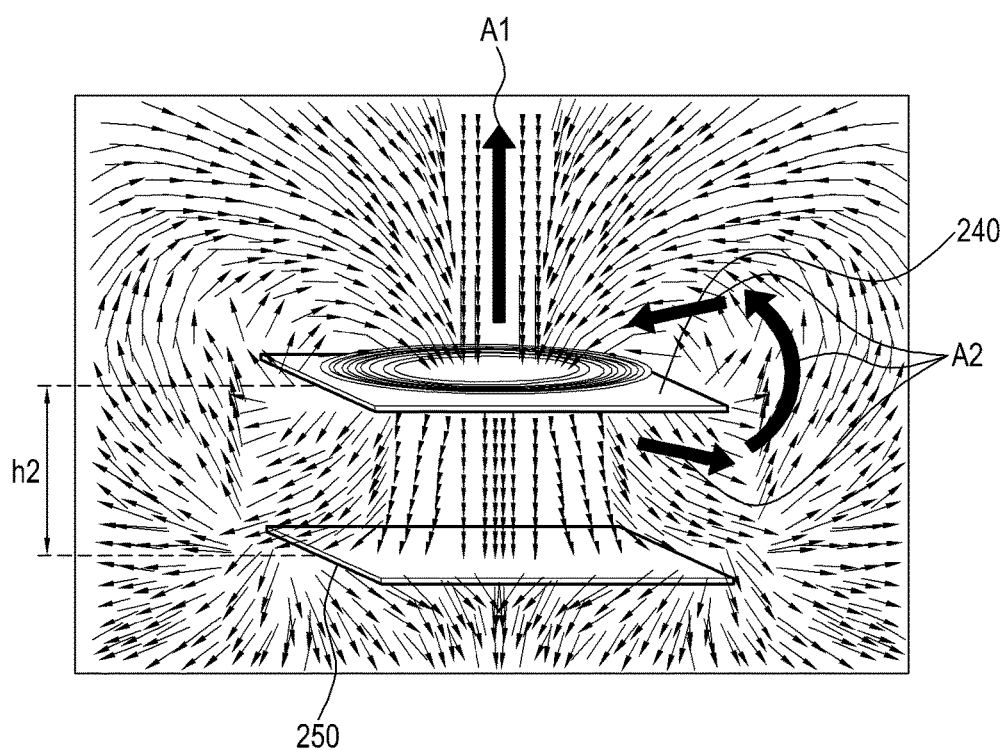
FIG. 5A is a view illustrating distribution of magnetic fields generated in a sheet and a transmission resonator of a configuration of a wireless charging device according to various embodiments of the present disclosure.
Figure 8:
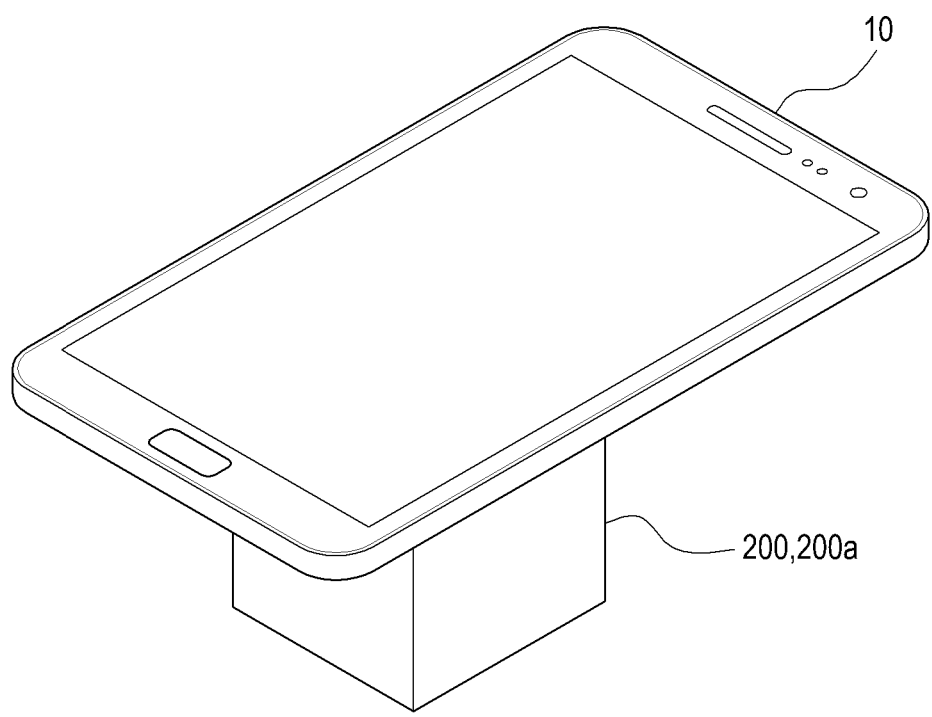
FIG. 8 is a perspective view illustrating a state in which an electronic device according to various embodiments of the present disclosure is positioned on a wireless charging device to be charged.
Figure 10:
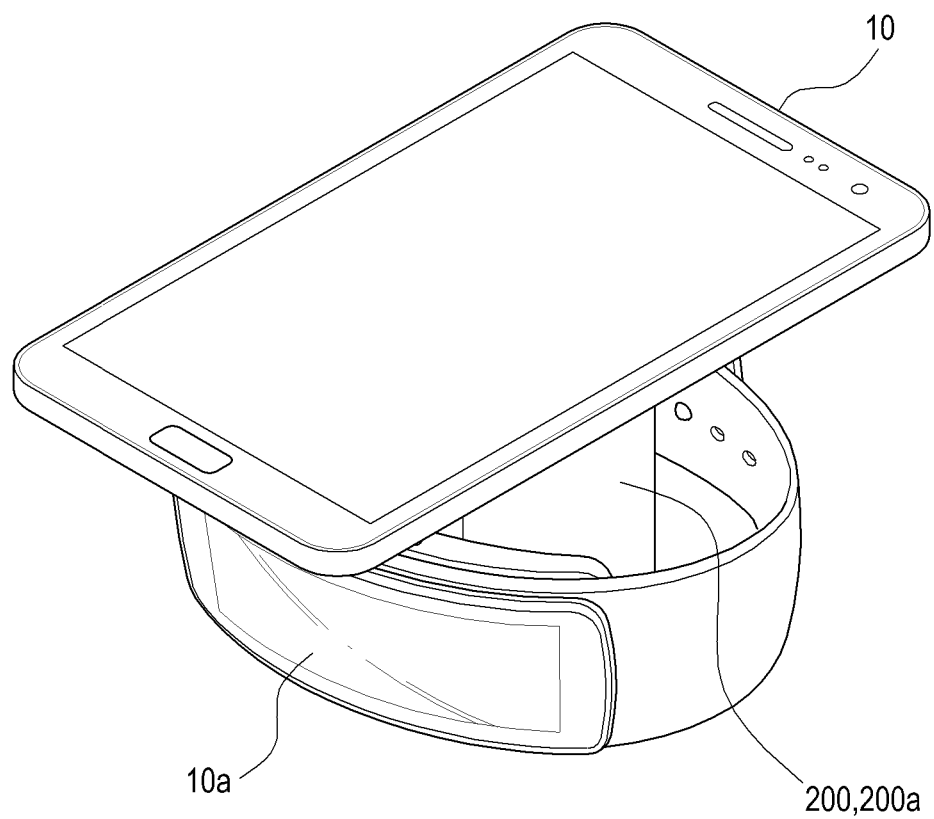
FIG. 10 is a perspective view illustrating a state in which an electronic device according to various embodiments of the present disclosure is positioned on an upper surface and a side surface of a wireless charging device to be charged.

FIG. 5A is a view illustrating the distribution of magnetic fields generated by the interaction of the transmission resonator 240 with the sheet 250 in the configuration where the wireless charging device 200 includes the sheet 250. FIG. 5B is a perspective view illustrating an operational state of the wireless charging device 200 including the sheet 250 according to the present disclosure. FIG. 8 is a perspective view illustrating an electronic device, according to various embodiments of the present disclosure, positioned on a wireless charging device 200 to be charged. FIG. 9 is a perspective view illustrating a wearable device, according to various embodiments of the present disclosure, placed around the wireless charging device 200 to be charged. FIG. 10 is a perspective view illustrating a first electronic device, according to various embodiments of the present disclosure, positioned on an upper surface and a second electronic device placed around the wireless charging device 200 to be charged.

In FIGS. 8 to 10, the wireless charging devices 200 and 200a are, respectively, a wireless charging device 200 that has a sheet 250 (FIG. 5A) and a wireless charging device 200a (FIG. 6A) that has no sheet.

Figure 5B:
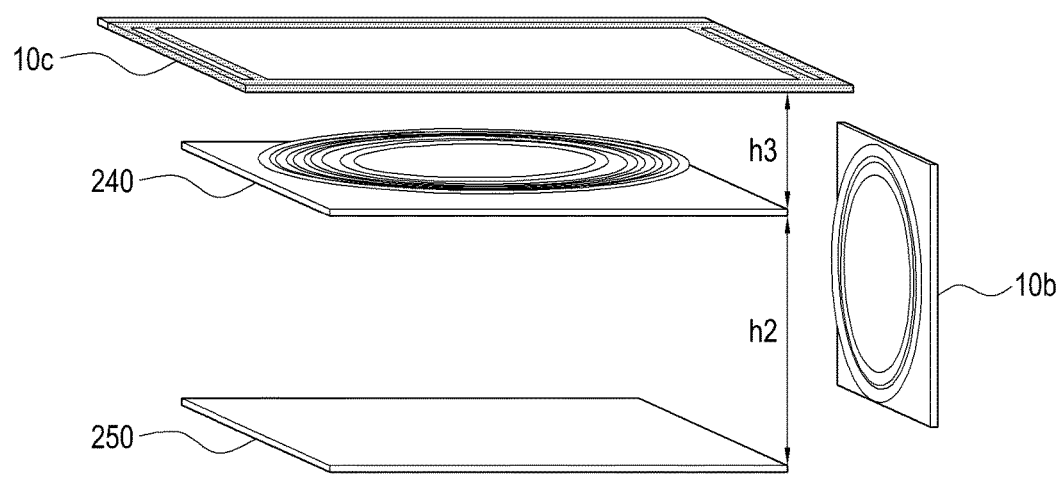
FIG. 5B is a perspective view illustrating an operational state of a wireless charging device including a sheet according to various embodiments of the present disclosure.

First, as illustrated in FIGS. 5A, 5B, and 8, if the electronic device 10 is positioned on an upper surface of the wireless charging device 200 that has the sheet 250, and electric power is supplied to the system board 220 of the wireless charging device 200, the power amplifier (not shown) of the system board 220 amplifies its input high frequency waveforms to output a high frequency waveform that can be communicated to the transmission resonator 240. Then, the transmission resonator 240 uses the high frequency AC current to generate the vertical magnetic field A1 and the horizontal magnetic field A2.

Here, the sheet 250 shields an electromagnetic field generated by the system board 220 from interfering with the vertical magnetic field A1 and the horizontal magnetic field A2, and vice versa.

The vertical magnetic field A1 of the transmission resonator 240 is received by a reception resonator 10b (FIG. 2) in the electronic device 10 positioned on an upper surface of the housing 210, and current is induced in the reception resonator 10b by the vertical magnetic field A1. In this way, the induced AC current in the reception resonator 10b is applied to a rectifier of a wireless power reception module (not shown) to produce a DC current, which can then be used to charge a battery in the electronic device 10. The wireless power reception module may include a reception resonator, a rectifier, a DC/DC converter, and a charger.

Accordingly, the induced AC current is provided to the rectifier, and the rectifier rectifies the induced AC current to DC current. Because the DC current from the rectifier does not have constant voltage, the DC/DC converter may adjust the DC voltage such that the DC voltage remains at a substantially constant value.

Therefore, a battery pack in the electronic device 10 may be charged by the charger in the wireless power reception module. In particular, the charger may include a charging IC for controlling a charging operation using an output voltage of the wireless power reception module and a battery pack.

The wireless power reception module comprising the rectifier, the DC/DC converter, and the charger of the wireless power reception module are not illustrated.

Similarly, as illustrated in FIGS. 5A, 5B, and 9, if a wearable device 10a having similar wireless power reception module is placed near a side surface of the wireless charging device 200 that has the sheet 250, the wearable device 10a may be charged similarly via the magnetic field A2.

As illustrated in FIG. 10, if the electronic device 10 is positioned on an upper surface of the wireless charging device 200 including the sheet 250 and the wearable device 10a is near a side surface of the wireless charging device 200, the wireless power reception module for each electronic device could charge its respective device at the same time via the vertical magnetic field A1 and the horizontal magnetic field A2, respectively, as described above.

The first, second, and third separation distances h1, h2, and h3 of the wireless charging device 200 that has the sheet 250 will be described below in more detail.

As illustrated in FIGS. 4A and 4B, the first separation distance h1 is between the top of the shield-can 230 and the sheet 250. By varying the first separation distance h1, the horizontal magnetic field A2 of the transmission resonator 240 can be changed. For example, when the size of the reception resonator 10b of the wearable device 10a is 30 mm, there is 30% or more efficiency in charging the wearable device 10a when the first separation distance h1 is 15 mm to 35 mm. That is, the first separation distance h1 may range from 0.5 times to 1.2 times the maximum linear dimension of the reception resonator 10b of the wearable device 10a to have 30% charging efficiency.

The second separation distance h2 is formed between the sheet 250 and the transmission resonator 240, and the efficiency of the transmission resonator 240 of the electronic device 10 may increase when the second separation distance h2 becomes smaller.

Similarly, the third separation distance h3 is formed between the top of the housing 210 and the transmission resonator 240, and the efficiency of the transmission resonator 240 of the electronic device 10 may increase when the third separation distance h3 becomes smaller. Accordingly, the second and third separation distances h2 and h3 may range from 0.3 times to 1.0 times the maximum linear dimension of the reception resonator 10b of the wearable device 10a.

A device for wirelessly transmitting electric power to charge the electronic device 10 may be the wireless charging device 200 that has sheet 250 (FIG. 4A) according to various embodiments of the present disclosure. Also, the electronic device 10 may be wirelessly charged by the wireless charging device 200a that does not have the sheet 250 (FIG. 6A).

Figure 6A:
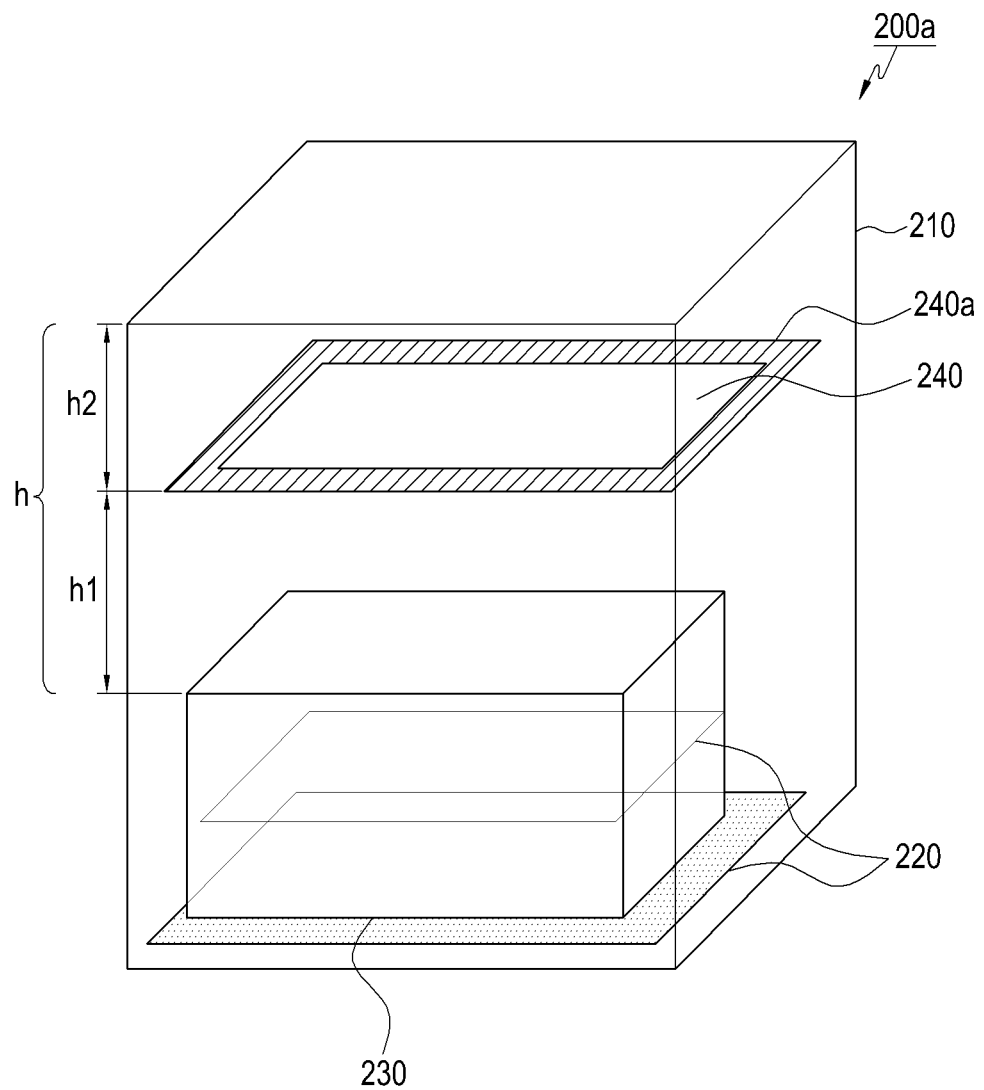
FIG. 6A is a perspective view illustrating a double layer arrangement of a system board of a configuration of another embodiment of a wireless charging device according to various embodiments of the present disclosure.
Figure 6B:
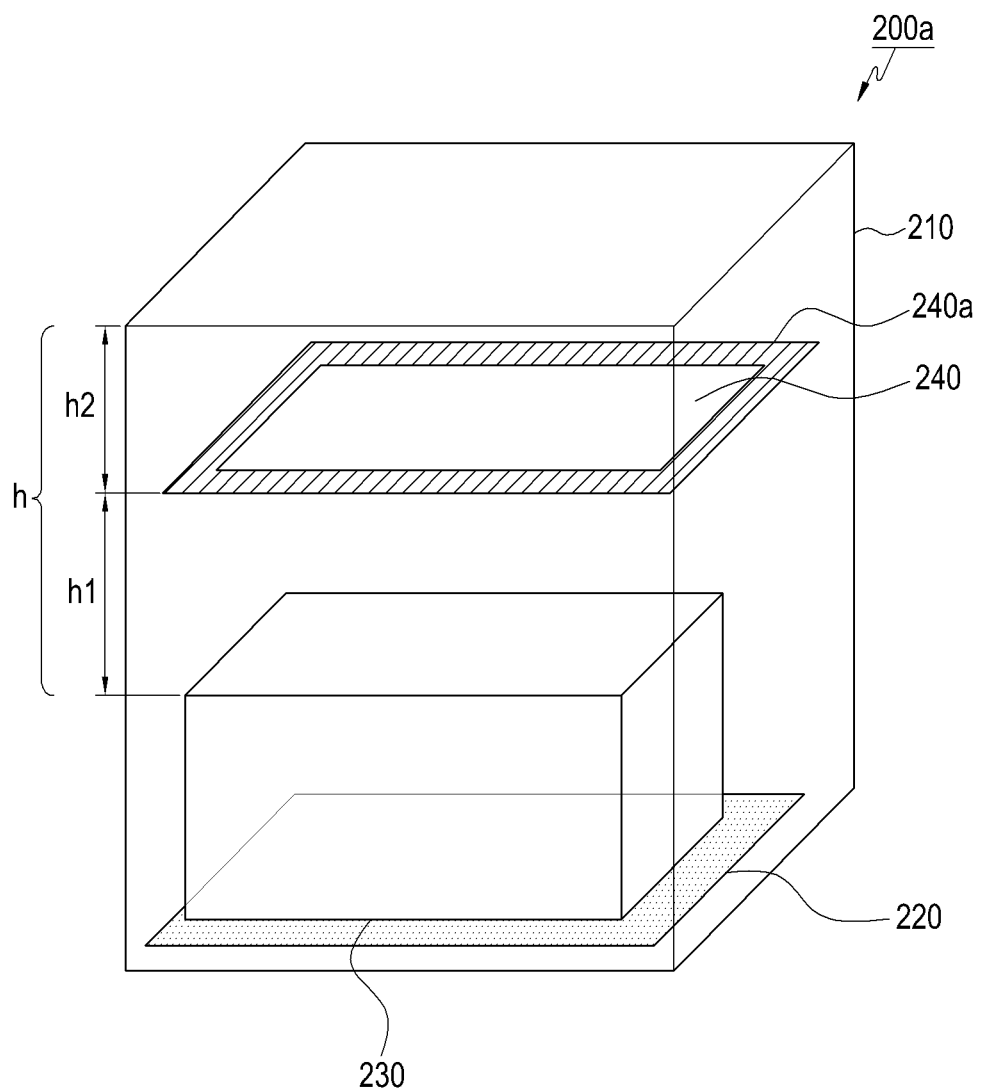
FIG. 6B is a perspective view illustrating a single layer arrangement of a system board of a configuration of another embodiment of a wireless charging device according to various embodiments of the present disclosure.

FIG. 6A is a perspective view illustrating a double layer arrangement of a system board 220 of a configuration of a wireless charging device having no sheet 250 according to various embodiments of the present disclosure. FIG. 6B is a perspective view illustrating a single layer arrangement of a system board 220 of a configuration of a wireless charging device 200a having no sheet 250 according to various embodiments of the present disclosure.

In the wireless charging device 200a having no sheet 250 according to various embodiments of the present disclosure, the system board 220 may be implemented by a double layer arrangement as illustrated in FIG. 6A and may be implemented by a single layer arrangement as illustrated in FIG. 6B. That is, when the system board 220 has a single layer structure, it is implemented by removing a system board 220 included in a shield-can 230. It is apparent that the wireless charging device 200a, according to various embodiments of the present disclosure, is not limited to the above-mentioned embodiments. In addition, the system board 220 is not limited to a double layer arrangement and a single layer arrangement. That is, when the system board 220a is provided in the wireless charging device 200, it may be implemented by several layers, in addition to a double layer and a single layer. Here, in various embodiments of the present disclosure, an embodiment in which the system board has a double layer arrangement will be described.

Referring to FIGS. 6A and 6B, the wireless charging device 200a having no sheet 250 includes a housing 210, a system board 220, a shield-can 230, and a transmission resonator 240.

The system board 220 includes a power amplifier (not shown), and the power amplifier generates AC power concentrated on a resonance frequency using DC power from a power source and a high frequency AC external power source. The power amplifier transmits high frequency AC waveforms to the transmission resonator 240 where the vertical magnetic field A1 and horizontal magnetic field A2 are generated.

The transmission resonator 240 may have a separation distance h between the housing 210 and the shield-can 230 such that a vertical magnetic field A1 and a horizontal magnetic field A2 are simultaneously generated by the high frequency AC waveform from the power amplifier. A shield member 240a is provided around the transmission resonator 240 to increase the resonance efficiency of the transmission resonator 240.

The system board 220 may be in the shield-can 230 in order to reduce electromagnetic interference between the system board 220 and the transmission resonator 240. That is, the shield-can 230 functions to shield an electromagnetic field generated by the system board 220 from the vertical magnetic field A1 and the horizontal magnetic field A2, and vice versa.

When the sheet 250 (FIG. 4A) is removed from a lower portion of the transmission resonator 240, the shield-can 230 may replace the function of the sheet 250. That is, because the shield-can 230 surrounds the system board 220, it shields the system board 220 from the transmission resonator 240, and vice versa.

Accordingly, instead of the sheet 250, the shield-can 230 shields the electromagnetic field generated by the system board 220 from the transmission resonator 240, and shields the vertical magnetic field A1 and the horizontal magnetic field A2 generated by the transmission resonator 240 from the system board 220.

As illustrated in FIG. 6A, the system board 220 has a double layer arrangement with a part of the system board 220 inside the shield-can 230 and part of the system board 220 outside the shield-can 230. That is, the system board 220 is provided inside the shield-can 230 and another system board 220 is below the shield-can 230 to be further from the transmission resonator 240. Also, as illustrated in FIG. 6B, the system board 220 has a single layer arrangement where there is just one system board 220 below the shield-can 230.

The transmission resonator 240 may simultaneously generate the vertical magnetic field A1 and the horizontal magnetic field A2 with the power amplifier (not shown), and may wirelessly charge an electronic device on the upper surface or near the side surface of the transmission resonator 240.

As illustrated in FIGS. 6A and 6B a separation distance h between the housing 210 and the shield-can 230 may include first and second separation distances h1 and h2. The first separation distance h1 is formed between the top of the shield-can 230 and the transmission resonator 240, and the second separation distance h2 is formed between the top of the housing 210 and the transmission resonator 240.

In addition, the areas of the vertical magnetic field A1 and the horizontal magnetic field A1 may be changed by varying the first and second separation distances h1 and h2. That is, the vertical magnetic field A1 and the horizontal magnetic field A2 may be controlled by adjusting the first separation distance h1 and the second separation distance h2.

Because the transmission resonator 240 is provided inside the housing 210, the electronic device 10 may be wirelessly charged when positioned on an upper surface or near a side surface of the housing 210.

Accordingly, an electronic device 10 positioned on the upper surface of the housing 210 and/or a wearable device 10a positioned near a side surface of the housing 210 may be wirelessly charged by one transmission resonator 240.

The wearable device 10a may be, for example, any one of a Head-Mounted Device (HMD) (e.g., electronic eyeglasses), electronic clothes, an electronic bracelet, an electronic necklace, an electronic appcessory, an electronic tattoo, and a smart watch. In an embodiment of the present disclosure, the disclosed device may be exemplified as the wearable device but the present disclosure is not limited thereto. That is, the present disclosure may be used to implement other devices than those described.

The housing 210 may be a rectangular or cylindrical. In various embodiments of the present disclosure, the housing 210 may have various shapes other than rectangular or cylindrical shapes.

The transmission resonator 240 may be formed of a printed circuit board having coiled or patterned traces for current path.

The power amplifier (not shown) may be a switching power amplifier of Class-E or Class-D type described previously.

An operation of the wireless charging device 200a having no sheet 250 will be described below in more detail with reference to FIGS. 7A and 7B.

Figure 7A:
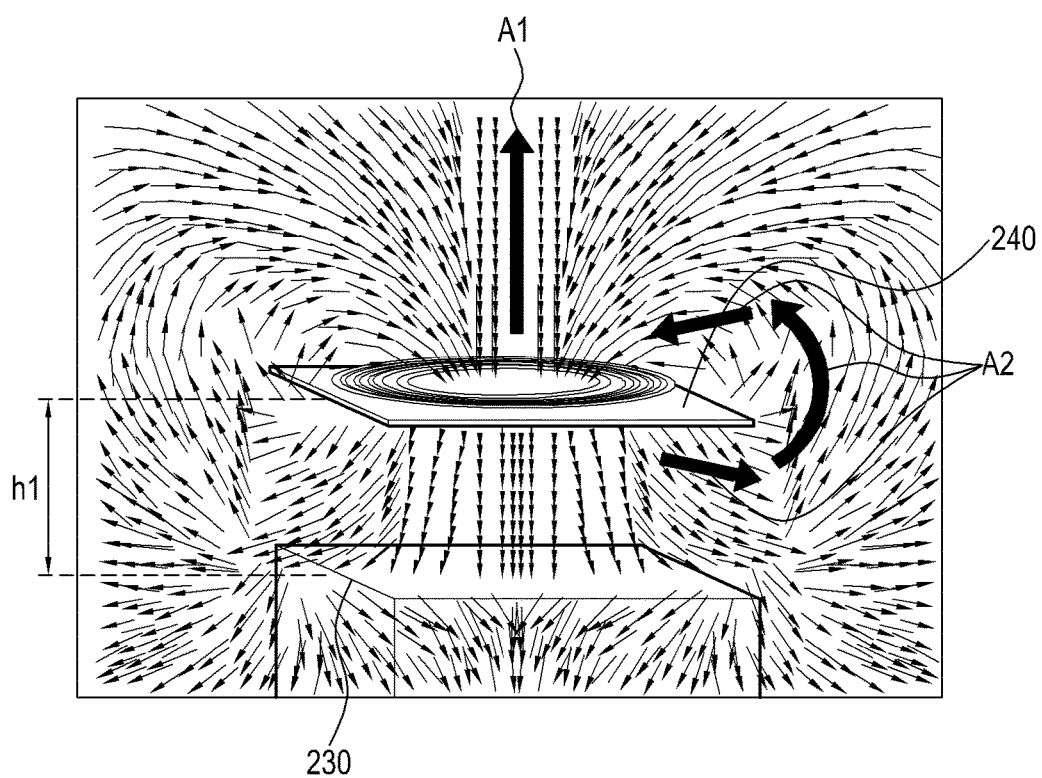
FIG. 7A is a view illustrating the distribution of magnetic fields generated in a transmission resonator of a configuration of another embodiment of a wireless charging device according to various embodiments of the present disclosure.

FIG. 7A is a view illustrating distribution of magnetic fields generated in the transmission resonator 240 of the configuration of the wireless charging device 200a having no sheet 250 according to the present disclosure. FIG. 7B is a perspective view illustrating an operational state of the wireless charging device 200a having no sheet 250 according to the present disclosure.

Figure 7B:
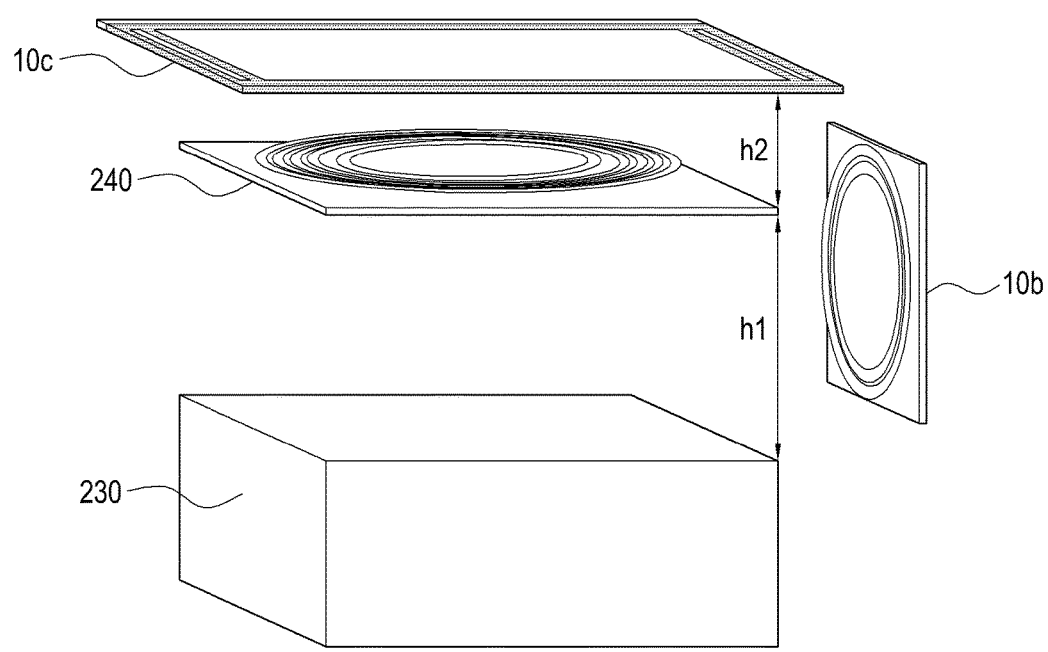
FIG. 7B is a perspective view illustrating an operational state of another embodiment of a wireless charging device including a sheet according to various embodiments of the present disclosure.

First, as illustrated in FIGS. 7A, 7B, and 8, to charge the electronic device 10 positioned on an upper surface of the wireless charging device 200a having no sheet 250, the power amplifier (not shown) of the system board 220 generates an AC current of a high frequency and communicates that current to the transmission resonator 240. Then, the high frequency AC current in the transmission resonator 240 generates the vertical magnetic field A1 and the horizontal magnetic field A2.

Because the shield-can 230 surrounds the system board 220, rather than the sheet 250, the shield-can 230 shields the vertical magnetic field A1 and the horizontal magnetic field A2 from the transmission resonator 240 to prevent the system board 220 from being adversely influenced, and shields an electromagnetic field of the system board 220 from the transmission resonator 240 to prevent the transmission resonator 240 from being adversely influenced by the electromagnetic field electromagnetic field of the system board 220.

The vertical magnetic field A1 of the transmission resonator 240 may be received by a reception resonator 10b in the electronic device 10 on an upper surface of the housing 210. Accordingly, current is induced in the reception resonator 10b by the vertical magnetic field A1 generated by the transmission resonator 240. In this way, the induced current is applied to a rectifier of a wireless power reception module (not shown). The wireless power reception module may include a reception resonator, a rectifier, a DC/DC converter, and a charger.

The induced current is then provided to the rectifier, and the rectifier rectifies the induced current into a DC current with a DC voltage. Because the DC voltage from the rectifier does not maintain a constant value, the DC/DC converter adjusts the DC voltage such that the rectified DC voltage is at a substantially constant voltage.

In this way, a battery pack in the electronic device 10 is charged wirelessly by the wireless charging device 200a. In particular, the charger may include a charging IC for controlling a charging operation using an output voltage of the rectifier, and a battery pack.

The rectifier, the DC/DC converter, and the charger of the wireless power reception module are not illustrated.

Similarly, as illustrated in FIGS. 7A, 7B, and 9, a wearable device 10a is placed near a side surface of the wireless charging device 200a. The power amplifier of the system board 220 generates an AC current of a high frequency and communicates the AC current to the transmission resonator 240. The transmission resonator 240 then generates the vertical magnetic field A1 and the horizontal magnetic field A2.

In this embodiment, since there is no sheet 250, the shield-can 230 shields an electromagnetic field generated by the system board 220.

The horizontal magnetic field A2 of the transmission resonator 240 is received by a reception resonator 10*b* provided in the wearable device 10*a* near a side surface of the housing 210, and current is induced in the reception resonator 10*b* by the horizontal magnetic field A2 generated by the transmission resonator 240. The induced current is then rectified by the rectifier of the wireless power reception module that may include a reception resonator, a rectifier, a DC/DC converter, and a charger.

Accordingly, the rectifier outputs a DC current with a DC voltage. Because the DC voltage from the rectifier does not maintain a constant value, the DC/DC converter is used to adjust the DC voltage to a substantially constant voltage. The battery pack may then be charged by the charger. In this way, a battery pack provided in the wearable device 10*a* is charged wirelessly by the wireless charging device 200*a*.

As illustrated in FIG. 10, if the electronic device 10 is on an upper surface of the wireless charging device 200*a* and the wearable device 10*a* is near a side surface of the wireless charging device 200*a* at the same time, both devices may be charged at the same time.

The first and second separation distances h1 and h2 of the wireless charging device 200*a* having no sheet 250 will be described below in more detail.

As illustrated in FIGS. 7A and 7B, the first separation distance h1 is between the top of the shield-can 230 and the transmission resonator 240. Varying the distance h1 may affect the horizontal magnetic field A2 of the transmission resonator 240. For example, when the reception resonator 10*b* of the wearable device 10*a* corresponds to 30 mm, a charging efficiency of 30% or more may be achieved when the first separation distance h1 is 15 mm to 35 mm. That is, the first separation distance h1 may range from 0.5 times to 1.2 times the maximum size of the reception resonator 10*b* of the wearable device 10*a*.

The second separation distance h2 is between the top of the housing 210 (the housing top is labelled as 10*c*) and the transmission resonator 240, and the efficiency of the resonator 240 of the wireless charging device 200 may increase when the h2 becomes smaller. That is, the first and second separation distances h1 and h2 may range from 0.3 times to 1.0 times the maximum size of the reception resonator 10*b* of, for example, the wearable device 10*a*.

According to various embodiments of the present disclosure, the wireless charging device 200*a* may have a predetermined distance h between the top of the housing 210 and the shield-can 230 without using a sheet 250. According to various embodiments of the present disclosure, the transmission resonator 240 of the wireless charging device 200*a* may simultaneously generate the vertical magnetic field A1 and the horizontal magnetic field A2. Since the wireless charging device 200*a* does not have the sheet 250 for shielding electromagnetic fields of the transmission resonator 240 and the system board 220, the product manufacturing costs can be reduced and productivity can be enhanced by reducing the number of assembly processes of the product. The electronic device 10 may be charged by an upper surface of the product as well as by a side surface of the product using the vertical magnetic field A1 and the horizontal magnetic field A2. Accordingly, the product can be miniaturized, manufacturing costs can be reduced, a degree of freedom of a charging operation can be secured, and charging efficiency can be improved.

FIGS. 11A, 11B, 11C, 11D, 11E, and 11F are views illustrating in-use states of the wireless charging devices 200 and 200*a* according to various embodiments of the present disclosure.

Figure 11A:
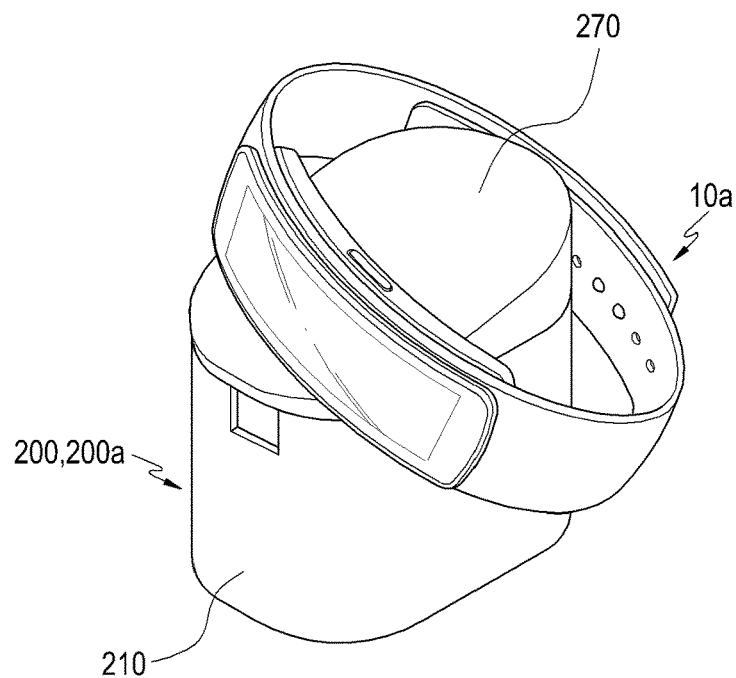
FIG. 11A is a view illustrating another embodiment of a wireless charging device according to various embodiments of the present disclosure, and is a perspective view illustrating a state in which a wearable device is charged on an inclined upper surface of the wireless charging device.
Figure 11B:
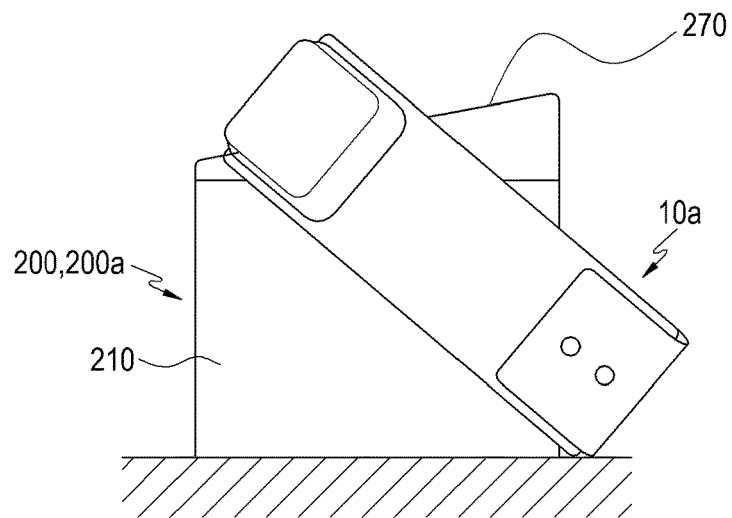
FIG. 11B is a view illustrating another embodiment of a wireless charging device according to various embodiments of the present disclosure, and is a side view illustrating a state in which a wearable device is charged on an inclined upper surface of the wireless charging device.
Figure 11C:
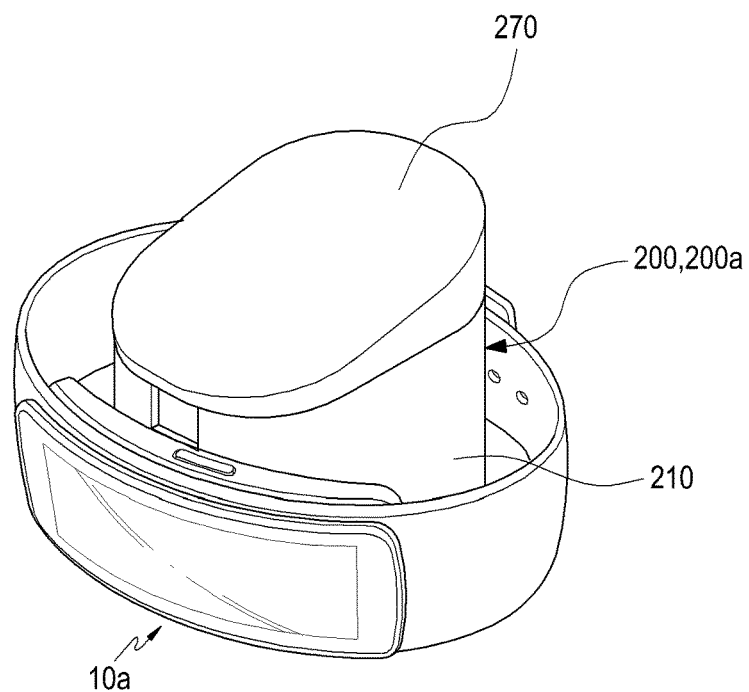
FIG. 11C is a view illustrating another embodiment of a wireless charging device according to various embodiments of the present disclosure, and is a perspective view illustrating a state in which a wearable device is charged on a side surface of the wireless charging device.
Figure 11D:
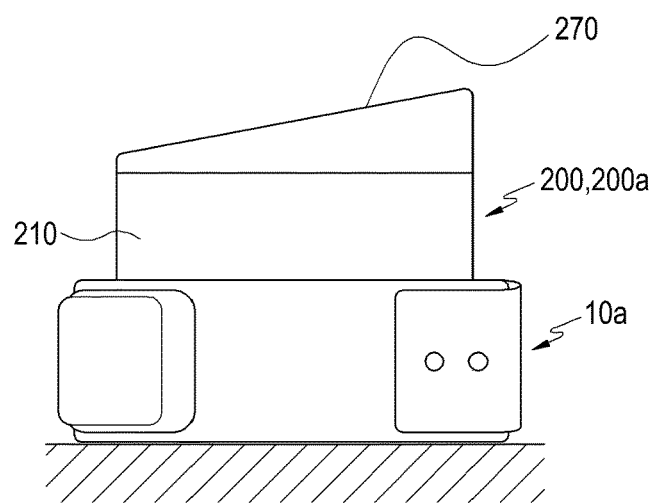
FIG. 11D is a view illustrating another embodiment of a wireless charging device according to various embodiments of the present disclosure, and is a side view illustrating a state in which a wearable device is charged on a side surface of the wireless charging device.
Figure 11E:
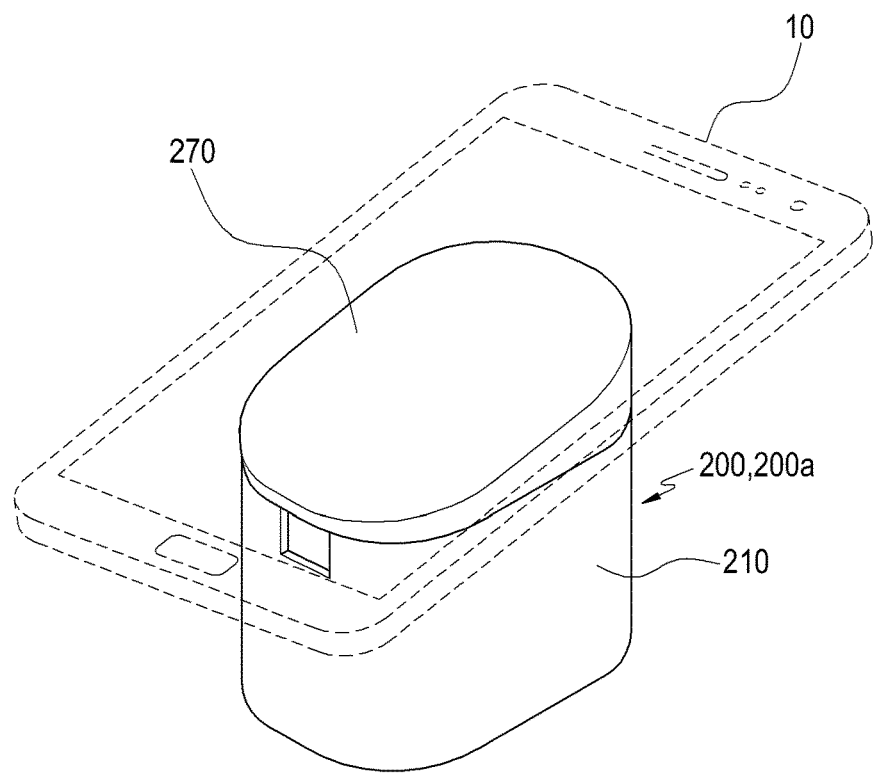
FIG. 11E is a view illustrating another embodiment of a wireless charging device according to various embodiments of the present disclosure, and is a perspective view illustrating a state in which an electronic device is charged on an inclined upper surface of the wireless charging device.
Figure 11F:
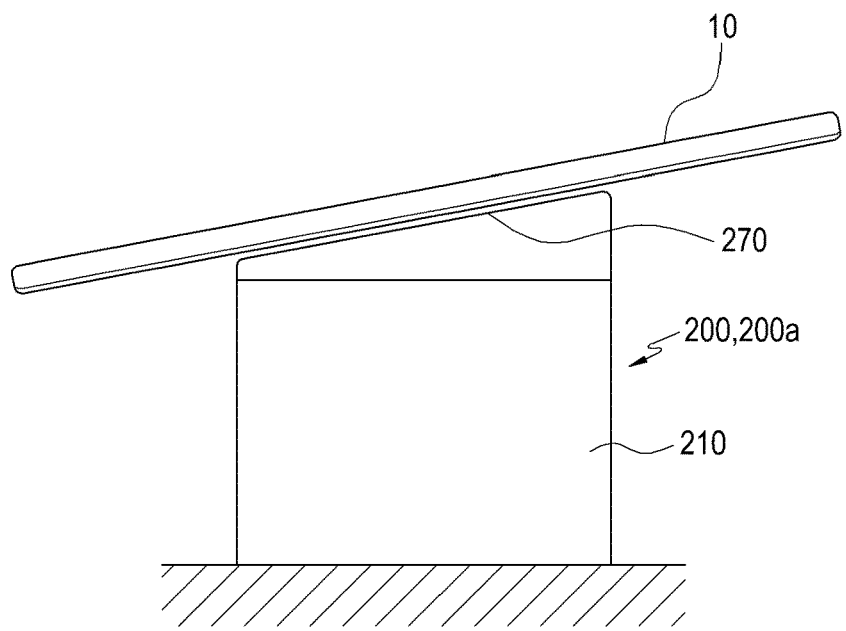
FIG. 11F is a view illustrating another embodiment of a wireless charging device according to various embodiments of the present disclosure, and is a side view illustrating a state in which an electronic device is charged on an inclined upper surface of the wireless charging device.

FIG. 11A is a perspective view illustrating a state in which the wearable device is charged on an inclined upper surface of the wireless charging device. FIG. 11B is a side view illustrating a state in which the wearable device is charged on an inclined upper surface of the wireless charging device. FIG. 11C is a perspective view illustrating a state in which the wearable device is charged on a side surface of the wireless charging device. FIG. 11D is a side view illustrating a state in which the wearable device is charged on a side surface of the wireless charging device. FIG. 11E is a perspective view illustrating a state in which the electronic device is positioned on an inclined surface of the wireless charging device to be charged. FIG. 11F is a side view illustrating a state in which the electronic device is positioned on an inclined surface of the wireless charging device to be charged.

Referring to FIGS. 11A and 11B, the wireless charging device 200 includes a housing 210, a system board 220, a shield-can 230, a transmission resonator 240 that simultaneously generates a vertical magnetic field and a horizontal magnetic field, and a sheet 250. The wireless charging device 200*a* may be the same as the wireless charging device 200 except that there is no sheet 250.

Here, the wireless charging devices 200 and 200*a* refer to a wireless charging device 200 including a sheet 250 and a wireless charging device 200*a* having no sheet, respectively.

A top surface 270, which may be inclined, is formed on the housing 210 such that the electronic device 10 and the wearable device 10*a* may be positioned on an incline on the upper surface of the housing 210.

The system board 220, the shield-can 230, the transmission resonator 240, and the sheet 250 are illustrated in FIGS. 4A, 4B, 5A, and 5B, which have been described above, and accordingly, a detailed description of the operations thereof will be omitted.

As illustrated in FIG. 11A, the wearable device 10*a* is positioned on the top surface 270, which may be inclined, of the housing 210. Then, the transmission resonator 240 (FIGS. 5A and 7A) included in the housing 210 generates the vertical magnetic field A1 (FIG. 5) and the horizontal magnetic field A2 (FIGS. 5A and 7A).

The vertical magnetic field A1 of the transmission resonator 240 is received by a reception resonator 10*b* (FIGS. 5B and 7B) provided in the wearable device 10*a* positioned on the top surface 270, which may be inclined, of the housing 210, and current is induced in the reception resonator 10*b* by the vertical magnetic field A1 generated by the transmission resonator 240. In this way, the generated current is applied to a rectifier of a wireless power reception module. Accordingly, the rectifier rectifies the generated AC current into DC current. Because the output of the rectifier does not maintain a constant voltage, the DC/DC converter may adjust the output of the rectifier to a substantially constant voltage. The charger may then charge the battery pack (not shown) of the wearable device 10*a* with the constant DC voltage.

As illustrated in FIGS. 11C and 11D, the wearable device 10*a* is placed near a side surface of the housing 210 to be wirelessly charged.

That is, the horizontal magnetic field A2 generated by the transmission resonator 240 is received by the reception resonator 10*b* in the wearable device 10*a* near a side surface of the housing 210, and current is induced in the reception resonator 10*b* by the horizontal magnetic field A2. The wireless power reception module converts the generated current to DC current of appropriate voltage to charge the battery pack of the wearable device.

In this way, the wearable device may be charged using the vertical magnetic field A1 of the wireless charging device 200 or 200a or by using the horizontal magnetic field A2 of the wireless charging device 200 or 200a.

As illustrated in FIGS. 11E and 11F, the electronic device 10 may be charged while positioned on the top surface 270, which may be inclined, of the housing 210. That is, the electronic device 10 positioned on the top surface 270 may be charged using the vertical magnetic field A1 (FIG. 6) of the transmission resonator 240 (FIGS. 5A and 7A) of the wireless charging devices 200 and 200a.

FIGS. 12A, 12B, 12C, 12D, 12E, and 12F are views illustrating in-use states of the wireless charging devices 200 and 200a having a V-shaped or U-shaped groove according to various embodiments of the present disclosure.

Figure 12A:
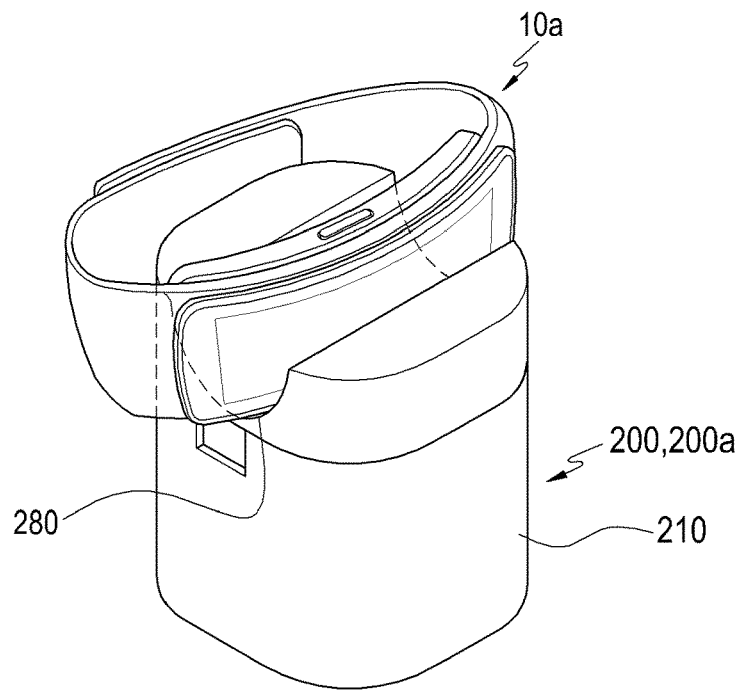
FIG. 12A is a perspective view illustrating another embodiment of a wireless charging device according to various embodiments of the present disclosure, and is a perspective view illustrating a state in which a wearable device is charged on an upper surface of the wireless charging device having a V-shaped or U-shaped groove.
Figure 12B:
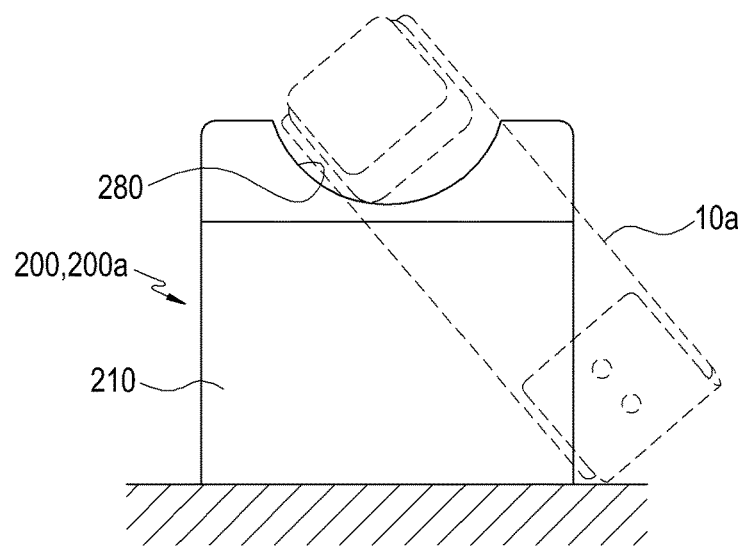
FIG. 12B is a view illustrating another embodiment of a wireless charging device according to various embodiments of the present disclosure, and is a side view illustrating a state in which a wearable device is charged on an upper surface of the wireless charging device having a V-shaped or U-shaped groove.
Figure 12C:
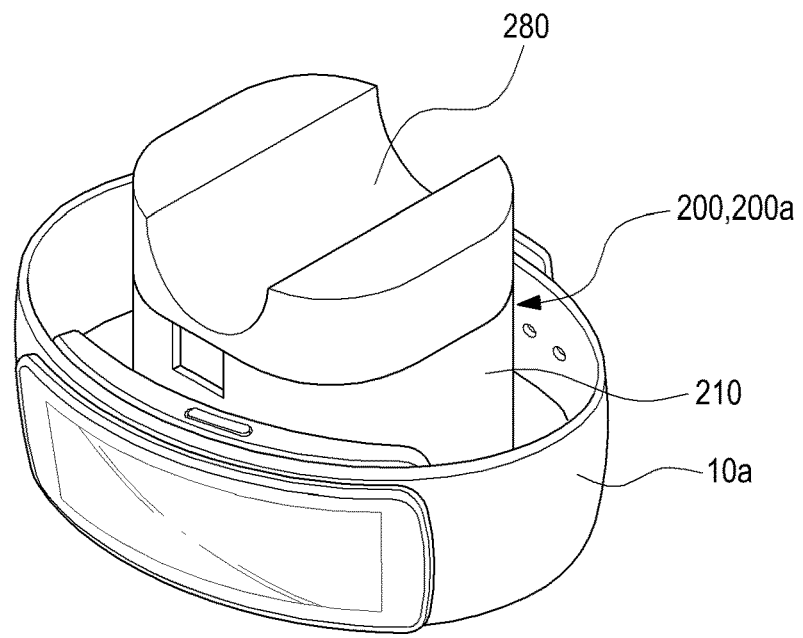
FIG. 12C is a view illustrating another embodiment of a wireless charging device according to various embodiments of the present disclosure, and is a perspective view illustrating a state in which a wearable device is charged on a side surface of the wireless charging device.
Figure 12D:
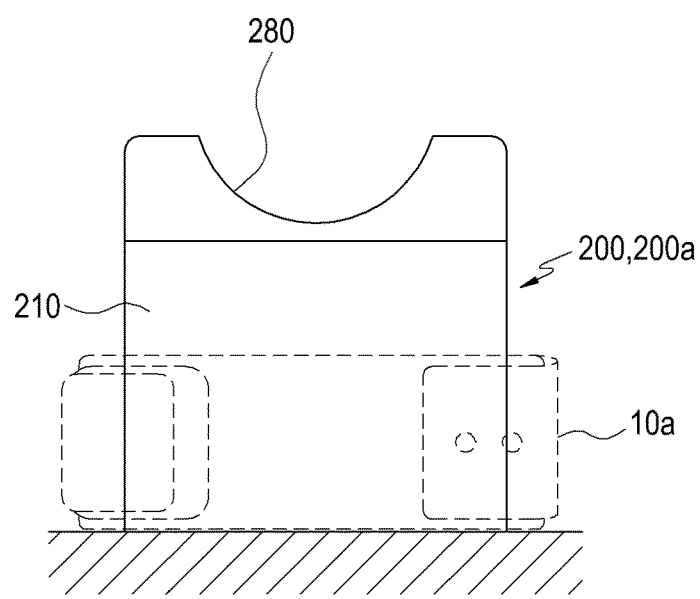
FIG. 12D is a view illustrating another embodiment of a wireless charging device according to various embodiments of the present disclosure, and is a side view illustrating a state in which a wearable device is charged on a side surface of the wireless charging device.
Figure 12E:
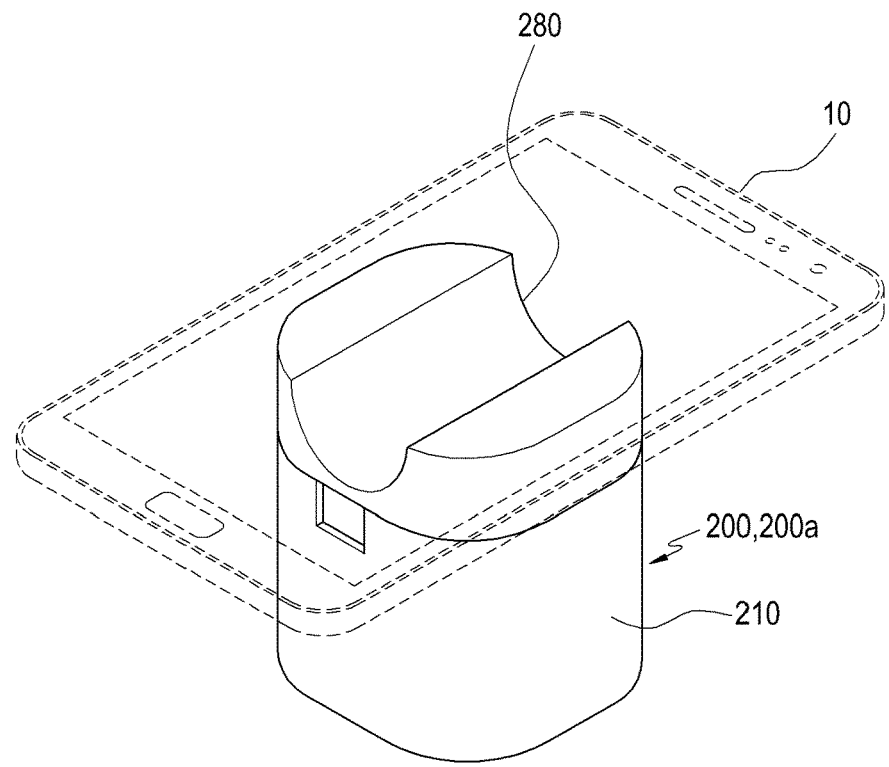
FIG. 12E is a view illustrating another embodiment of a wireless charging device according to various embodiments of the present disclosure, and is a perspective view illustrating a state in which an electronic device is charged on an upper surface of the wireless charging device having a V-shaped or U-shaped groove.
Figure 12F:
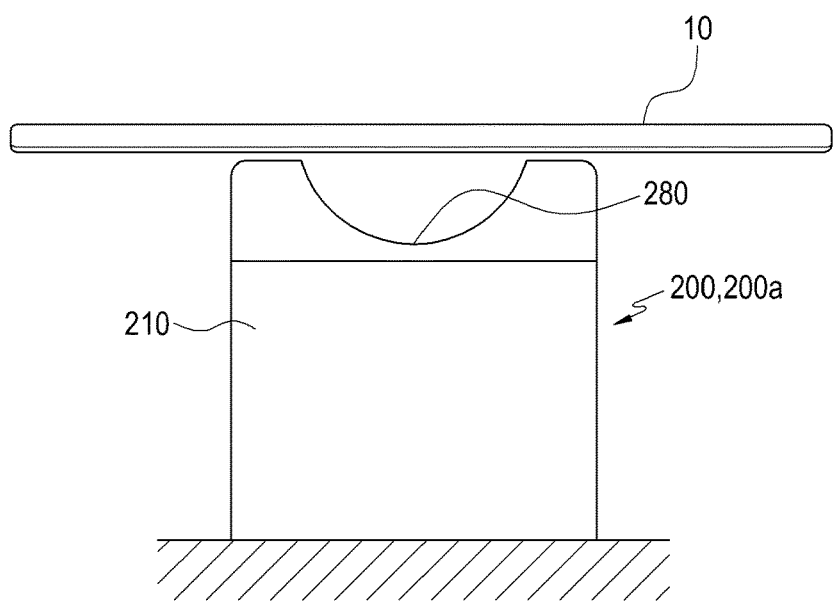
FIG. 12F is a side view illustrating another embodiment of a wireless charging device according to various embodiments of the present disclosure, and is a side view illustrating a state in which an electronic device is charged on an upper surface of the wireless charging device having a V-shaped or U-shaped groove.

FIG. 12A is a perspective view illustrating a state in which the wearable device is charged on an upper surface of the wireless charging device 200 and 200a having a V-shaped or U-shaped groove. FIG. 12B is a side view illustrating a state in which the wearable device is charged on an upper surface of the wireless charging device 200 and 200a having a V-shaped or U-shaped groove. FIG. 12C is a perspective view illustrating a state in which the wearable device is charged on a side surface of the wireless charging device 200 and 200a. FIG. 12D is a side view illustrating a state in which the wearable device is charged on a side surface of the wireless charging device. FIG. 12E is a perspective view illustrating a state in which the electronic device is positioned on an upper surface of the wireless charging device having a V-shaped or U-shaped groove to be charged. FIG. 12F is a side view illustrating a state in which the electronic device is positioned on an upper surface of the wireless charging device 200 and 200a having a V-shaped or U-shaped groove to be charged.

Referring to FIGS. 12A and 12B, the wireless charging device 200 includes a housing 210, a system board 220, a shield-can 230, a transmission resonator 240 that simultaneously generates a vertical magnetic field A1 and a horizontal magnetic field A2, and a sheet 250 (FIG. 5A). The wireless charging device 200a is similar to the wireless charging device 200 except it does not have the sheet 250.

A V-shaped or U-shaped groove 280 may be formed on an upper surface of the housing 210. In an embodiment of the present disclosure, a groove having any shape other than the V shape or U shape may be applied to the upper surface of the cylindrical housing. Here, in an embodiment of the present disclosure, the housing 210 having a U-shaped groove 280 will be described.

The system board 220, the shield-can 230, the transmission resonator 240, and the sheet 250 are illustrated in FIGS. 4A, 4B, 5A, and 5B, which have been mentioned above, and accordingly, a detailed description of the operations thereof will be omitted.

As illustrated in FIGS. 12A and 12B, the wearable device 10a may be positioned in the U-shaped groove 280 formed on the upper surface of the housing 210 to be wirelessly charged. The wearable device 10a may be charged by the vertical magnetic field A1 as described with respect to previous figures.

As illustrated in FIGS. 12C and 12D, the wearable device 10a is positioned near a side surface of the housing 210 to be wirelessly charged. The wearable device 10a may be charged by the horizontal magnetic field A2 as described with respect to previous figures.

In this way, the wearable device may be charged using the vertical magnetic field A1 and the horizontal magnetic field A2. Accordingly, by providing a U-shaped groove 280 on an upper surface of the wireless charging device 200 and 200a, charging of the wearable device 10a on an upper surface of the wireless charging device 200 and 200a may be facilitated, as well as being able to charge the wearable device 10a by placing it on the top surface.

As illustrated in FIGS. 12E and 12F, the electronic device 10 may be charged while being positioned on the top surface 270 of the housing 210 alone. That is, the electronic device 10 positioned on the U-shaped groove 280 may be charged using the vertical magnetic field A1 (FIGS. 5A and 7A) of the transmission resonator 240 (FIGS. 5A and 7A) of the wireless charging device 200.

It is noted by those skilled in the art to which the present disclosure pertains that the wireless charging devices that wirelessly transmits electric power according to various embodiments of the present disclosure, which have been described above, are not limited by the above-mentioned embodiments and the drawings, but may be variously replaced, modified, and changed without departing from the scope of the present disclosure.

What is claimed:

1. A wireless charging device for wirelessly transmitting electric power to an electronic device, the wireless charging device comprising:
    a housing;
    a shield-can provided within the housing, with a separation distance between a top of the housing and a top of the shield-can;
    a system board provided within the housing and comprising a power amplifier;
    a transmission resonator provided between the top of the housing and the top of the shield-can and configured to simultaneously generate a vertical magnetic field and a horizontal magnetic field; and
    a metal sheet provided between the shield-can and the transmission resonator and configured to control at least one from among an intensity and a direction of at least one from among the vertical magnetic field and the horizontal magnetic field,
    wherein the transmission resonator is positioned in a horizontal direction within the housing, with respect to the top of the housing,
    the separation distance comprises a first separation distance between the top of the shield-can and the metal sheet, a second separation distance between the metal sheet and the transmission resonator, and a third separation distance between the transmission resonator and the top of the housing, and
    the at least one from among the intensity and the direction of the at least one from among the vertical magnetic field and the horizontal magnetic field is changed by varying at least one from among the first separation distance, the second separation distance, and the third separation distance.

2. The wireless charging device of claim 1, wherein the housing is a rectangular housing or a cylindrical housing.

3. The wireless charging device of claim 1, wherein the electronic device is configured to be positioned on the top of the housing, to be charged.

4. The wireless charging device of claim 1, wherein the electronic device is configured to be positioned near a side surface of the housing, to be charged.

5. The wireless charging device of claim 1, wherein a first electronic device is configured to be positioned on the top of the housing, to be charged, and
a second electronic device is configured to be positioned near a side surface of the housing, to be charged.

6. The wireless charging device of claim 1, wherein the electronic device is a wearable device.

7. The wireless charging device of claim 6, wherein the wearable device is any one of a Head-Mounted Device (HMD), electronic clothes, an electronic bracelet, an electronic necklace, an electronic appcessory, an electronic tattoo, and a smart watch.

8. The wireless charging device of claim 1, wherein the top of the housing is an inclined surface.

9. The wireless charging device of claim 8, wherein the electronic device is configured to be positioned on the inclined surface, to be charged.

10. The wireless charging device of claim 1, wherein a groove having one from among a V shape and a U shape is formed on the top of the housing.

11. The wireless charging device of claim 10, wherein the electronic device is a wearable device configured to be positioned in the groove, to be charged.

12. The wireless charging device of claim 1, wherein a shield member is provided around an outer circumference of the transmission resonator.

13. The wireless charging device of claim 1, wherein, when the metal sheet is removed, the shield-can is configured to shield the system board from a first electromagnetic field from the transmission resonator and the transmission resonator from a second electromagnetic field from the system board.

14. The wireless charging device of claim 1, wherein the transmission resonator comprises a printed circuit board having a coiled or a patterned current path.

15. The wireless charging device of claim 1, wherein the system board comprises a double layer arrangement with one layer of the system board inside the shield-can and a second layer of the system board outside the shield-can.

16. The wireless charging device of claim 1, wherein the power amplifier is a switching power amplifier of Class-E or Class-D.

17. A wireless charging device for wirelessly transmitting electric power to an electronic device, the wireless charging device comprising:
a housing;
a shield-can provided within the housing, with a separation distance between a top of the housing and a top of the shield-can;
a system board provided within the housing and comprising a power amplifier; and
a transmission resonator provided between the top of the housing and the top of the shield-can configured to simultaneously generate a vertical magnetic field and a horizontal magnetic field,
wherein the transmission resonator is positioned in a horizontal direction within the housing, with respect to the top of the housing,
wherein the separation distance comprises a first separation distance and a second separation distance, the first separation distance is between the top of the shield-can and the transmission resonator, and the second separation distance is between the top of the housing and the transmission resonator, and
wherein at least one from among an intensity and a direction of at least one from among the vertical magnetic field and the horizontal magnetic field is changed by varying at least one from among the first separation distance and the second separation distance.

18. The wireless charging device of claim 17, wherein the housing has a cylindrical shape or a rectangular shape.

19. The wireless charging device of claim 17, wherein the shield-can is configured to shield the system board from the vertical magnetic field and the horizontal magnetic field generated by the transmission resonator and shield the transmission resonator from an electromagnetic field generated by the system board.

20. The wireless charging device of claim 17, wherein the electronic device is configured to be positioned on the top of the housing, to be charged.

21. The wireless charging device of claim 17, wherein the electronic device is configured to be positioned near a side surface of the housing, to be charged.

22. The wireless charging device of claim 17, wherein a first electronic device is configured to be positioned on the top of the housing, to be charged, and
a second electronic device is configured to be positioned near a side surface of the housing, to be charged.

23. The wireless charging device of claim 17, wherein the electronic device is a wearable device.

24. The wireless charging device of claim 17, wherein a shield member is provided around an outer circumference of the transmission resonator.

25. The wireless charging device of claim 17, wherein the system board comprises a double layer arrangement with one layer of the system board inside the shield-can and a second layer of the system board outside the shield-can.

26. The wireless charging device of claim 17, wherein the power amplifier is a switching power amplifier of Class-E or Class-D.

* * * * *